US008725782B2

(12) United States Patent
Starks et al.

(10) Patent No.: US 8,725,782 B2
(45) Date of Patent: May 13, 2014

(54) VIRTUAL DISK STORAGE TECHNIQUES

(75) Inventors: John A. Starks, Seattle, WA (US);
Dustin L. Green, Redmond, WA (US);
Todd William Harris, Sammamish, WA (US); Mathew John, Redmond, WA (US); Senthil Rajaram, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 13/093,731

(22) Filed: Apr. 25, 2011

(65) Prior Publication Data
US 2012/0272240 A1    Oct. 25, 2012

(51) Int. Cl.
*G06F 12/00*    (2006.01)
*G06F 17/30*    (2006.01)
*G06F 9/455*    (2006.01)
*G06F 11/14*    (2006.01)

(52) U.S. Cl.
CPC ........ *G06F 9/45533* (2013.01); *G06F 11/1471* (2013.01)
USPC ....................................... 707/822

(58) Field of Classification Search
None
See application file for complete search history.

(56) References Cited

U.S. PATENT DOCUMENTS

| 5,043,866 | A | 8/1991 | Myre, Jr. et al. |
| 6,304,983 | B1 | 10/2001 | Lee et al. |
| 6,697,881 | B2 | 2/2004 | Cochran |
| 7,107,385 | B2 | 9/2006 | Rajan et al. |
| 7,299,333 | B2 | 11/2007 | Mizuno et al. |
| 7,373,548 | B2 | 5/2008 | Reinhardt et al. |
| 7,480,761 | B2 * | 1/2009 | Birrell et al. ................. 711/103 |
| 7,567,985 | B1 | 7/2009 | Comay et al. |
| 7,694,105 | B2 | 4/2010 | Sanvido |
| 7,783,833 | B2 | 8/2010 | Kumagai |
| 7,801,852 | B2 | 9/2010 | Wong et al. |
| 7,886,115 | B2 | 2/2011 | Sanvido et al. |
| 8,261,267 | B2 | 9/2012 | Iwamatsu et al. |
| 8,332,370 | B2 | 12/2012 | Gattegno et al. |
| 2002/0178335 | A1 | 11/2002 | Selkirk et al. |
| 2003/0058238 | A1 | 3/2003 | Doak et al. |
| 2006/0218544 | A1 | 9/2006 | Chakraborty et al. |
| 2007/0250672 | A1 * | 10/2007 | Stroberger et al. ........... 711/162 |

(Continued)

FOREIGN PATENT DOCUMENTS

JP    2010-033206    2/2010

OTHER PUBLICATIONS

Hansen, Jacob Gorm, and Eric Jul. "Lithium: virtual machine storage for the cloud." Proceedings of the 1st ACM symposium on Cloud computing. ACM, 2010.*

(Continued)

*Primary Examiner* — Jay Morrison
(74) *Attorney, Agent, or Firm* — John Jardine; Andrew Saunders; Micky Minhas

(57) ABSTRACT

This document describes techniques for effecting a virtual disk. In an exemplary configuration, a virtual disk file can be associated with a log that acts as both a log and a check point record. When a log entry is generated, information that identifies the tail can be stored therein. This information can be used in the event that virtual disk file is improperly closed, i.e., a crash or power failure occurs, to discover a sequence of log entries to replay. In addition to the foregoing, other techniques are described in the claims, detailed description, and figures.

20 Claims, 19 Drawing Sheets

(56) References Cited

U.S. PATENT DOCUMENTS

| | | |
|---|---|---|
| 2007/0260831 A1 | 11/2007 | Michael et al. |
| 2008/0120470 A1 | 5/2008 | Dhamankar et al. |
| 2008/0147755 A1 | 6/2008 | Chapman |
| 2008/0155223 A1 | 6/2008 | Hiltgen et al. |
| 2008/0208927 A1* | 8/2008 | Chikusa et al. ............ 707/203 |
| 2009/0198731 A1 | 8/2009 | Noonan, III |
| 2009/0282101 A1 | 11/2009 | Lim et al. |
| 2010/0042796 A1 | 2/2010 | Vasilevsky et al. |
| 2010/0070725 A1 | 3/2010 | Prahlad et al. |
| 2010/0122248 A1 | 5/2010 | Robinson et al. |
| 2010/0211737 A1 | 8/2010 | Flynn et al. |
| 2010/0228913 A1* | 9/2010 | Czezatke et al. ............ 711/112 |
| 2010/0235831 A1 | 9/2010 | Dittmer |
| 2010/0241785 A1 | 9/2010 | Chen et al. |
| 2010/0250630 A1 | 9/2010 | Kudo |
| 2010/0306467 A1 | 12/2010 | Pruthi et al. |
| 2011/0055406 A1 | 3/2011 | Piper et al. |
| 2011/0072059 A1 | 3/2011 | Guarraci |
| 2011/0072207 A1* | 3/2011 | Jin et al. .................... 711/112 |
| 2011/0197022 A1 | 8/2011 | Green et al. |
| 2012/0079583 A1 | 3/2012 | Christiansen et al. |
| 2012/0110281 A1 | 5/2012 | Green et al. |
| 2012/0233434 A1 | 9/2012 | Starks et al. |
| 2013/0117223 A1 | 5/2013 | Niki |

OTHER PUBLICATIONS

Hansen, Jacob Gorm, and Eric Jul. "Scalable virtual machine storage using local disks." ACM SIGOPS Operating Systems Review 44.4: 71-79, Dec. 2010.*

International Patent Application No. PCT/US2012/027645: International Search Report and Written Opinion dated Sep. 25, 2012, 9 pages.

"Deploying Virtual Hard Disk Images", www.technet.microsoft.com-en-us-library-dd363560(WS.10,printer).aspx, accessed Dec. 8, 2010, 1-8.

"Using Differencing Disks", www.technet.microsoft.com-en-us-library-cc720381(WS.10,printer).aspx, accessed Dec. 8, 2010, 1-3.

"Troubleshooting Parent Virtual Disk Errors in Fusion", http:--kb.vmware.com-selfservice-microsites-search.do?language=en_US&cmd=displayKC&externalId=1018832, accessed Feb. 23, 2011, 1-7.

"Virtual Hard Disk Image Format Specification", Microsoft Corporation, Oct. 11, 2006, 1-8.

"VMWare Recovering Vmware Snapshot after Parent Changed", http:--it.it-larsen.dk-index.php?option=com_content&view=article&id=6:vmware-recovering-vmware-snapshot-after-parent-changed&catid=1:vmware-35&Itemid=4, accessed Feb. 23, 2011, 1-3.

Kerr, "The Virtual Disk API in Windows 7", http:--msdn.microsoft.com-en-us-magazine-dd569754.aspx, accessed Feb. 23, 2011, 1-7.

Yang et al., "Windows Server 2008", Virtual Hard Disk Performance, A Microsoft White Paper, Mar. 2010, 1-35.

International Patent Application No. PCT/US2011/055591, International Search Report dated May 31, 2012, 8 pages.

International Patent Application No. PCT/US2011/055586, International Search Report dated May 31, 2012, 8 pages.

"FSCTL_FILE_LEVEL_TRIM Control Code", Retrieved on: Jul. 11, 2012, Available at: http://msdn.microsoft.com/en-us/library/windows/hardware/hh451098(v=vs.85).aspx.

"TRIM/UNMAP Support in Windows Server 2012 & Hyper-V/VHDX", Published on: May 23, 2012, Available at: http://workinghardinit.wordpress.com/2012/05/23/trimunmap-support-in-windows-server-2012-hyper-vvhdx/.

Campbell, Lisa, "Hyper-V Scalability Evident in Its New Virtual Disk Format", Published on: Jul. 9, 2012, Available at: http://www.unitrends.com/hyper-v-backup/hyper-v-scalability-evident-virtual-disk-format/.

"How to Resize a Microsoft Virtual Hard Drive (VHD)", http:--sysadmingeek.com-articles-how-to-resize-a-microsoft-virtual-hard-drive-vhd-file-, accessed Jan. 24, 2011, 1-10.

Agarwal, "Distributed Checkpointing of Virtual Machines in Xen Framework", Thesis Submitted in Partial Fulfillment of the Requirements for the Degree of Master of Technology in Computer Science and Engineering, Department of Computer Science and Engineering, Indian Institute of Technology, Kharagpur, May 2008, 1-44.

Elnozahy et al., "The performance of Consistent Checkpointing", 11th Symposium on Reliable Distributed Systems, Houston, TX, USA, Oct. 5-7, 1992, 39-47.

* cited by examiner

VIRTUAL DISK STORAGE TECHNIQUES

BACKGROUND

Storage virtualization technology allows for the separation of logical storage from physical storage. One exemplary use case for storage virtualization is within a virtual machine. A layer of virtualizing software (typically called a hypervisor or virtual machine monitor) is installed on a computer system and controls how virtual machines interact with the physical hardware. Since guest operating systems are typically coded to exercise exclusive control over the physical hardware, the virtualizing software can be configured to subdivide resources of the physical hardware and emulate the presence of physical hardware within the virtual machines. Another use case for storage virtualization is within a computer system configured to implement a storage array. In this case, physical computer systems or virtual machines can be connected to the storage array using the iSCSI protocol, or the like.

A storage handling module can be used to emulate storage for either a virtual or physical machine. For example, a storage handling module can handle storage IO jobs issued by a virtual or physical machine by reading and writing to one or more virtual disk files, which can be used to describe, i.e., store, the extents of the virtual disk, i.e., a contiguous area of storage such as a block. Likewise, the storage handling program can respond to write requests by writing bit patterns data for the virtual disk to one or more virtual disk files and respond to read requests by reading the bit patterns stored in the one or more virtual disk files.

SUMMARY

This document describes techniques for effecting a virtual disk. In an exemplary configuration, a virtual disk file can be associated with a log that acts as both a log and a check point record. When a log entry is generated, information that identifies the tail can be stored in the log entry. This information can be used in the event that virtual disk file is improperly closed, i.e., a crash or power failure occurs, to discover a sequence of log entries to replay. In addition to the foregoing, other techniques are described in the claims, detailed description, and figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., an execution unit that reads and executes instructions, configured by firmware and/or software. Processor(s) and the like can be configured by instructions loaded from memory, e.g., RAM, ROM, firmware, and/or mass storage, and the instructions can embody logic operable to configure the processor to perform one or more function. A specific example of circuitry can include a combination of hardware and software. In this specific example, an implementer may write source code embodying logic that is subsequently compiled into machine readable code that can be executed by the processor.

One skilled in the art can appreciate that the state of the art has evolved to a point where there is little difference between functions implemented in hardware and functions implemented in software (which are subsequently executed by hardware). As such, the description of functions as being implemented in hardware or software is merely a design choice. Simply put, since a software process can be transformed into an equivalent hardware structure and a hardware structure can itself be transformed into an equivalent software process, functions described as embodied in instructions could alternatively be implemented in hardware and vice versa.

Figure 1:
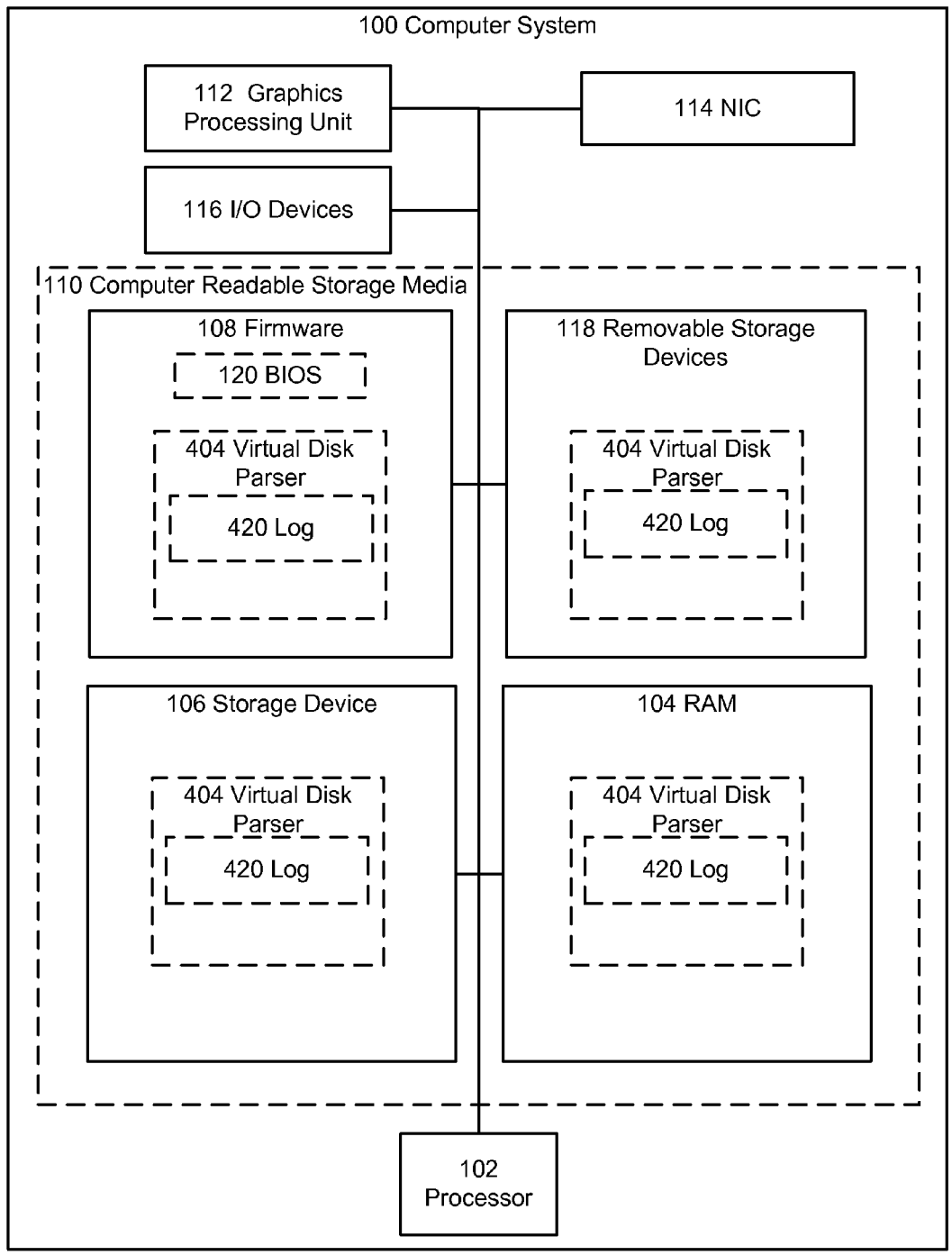
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs. In exemplary embodiments, computer-readable storage media 110 can store virtual disk parser 404, which is described in more detail in the following paragraphs, can be executed by processor 102 thereby transforming computer system 100 into a computer system configured for a specific purpose, i.e., a computer system configured according to techniques described in this document.

Commands and information may be received by computer 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
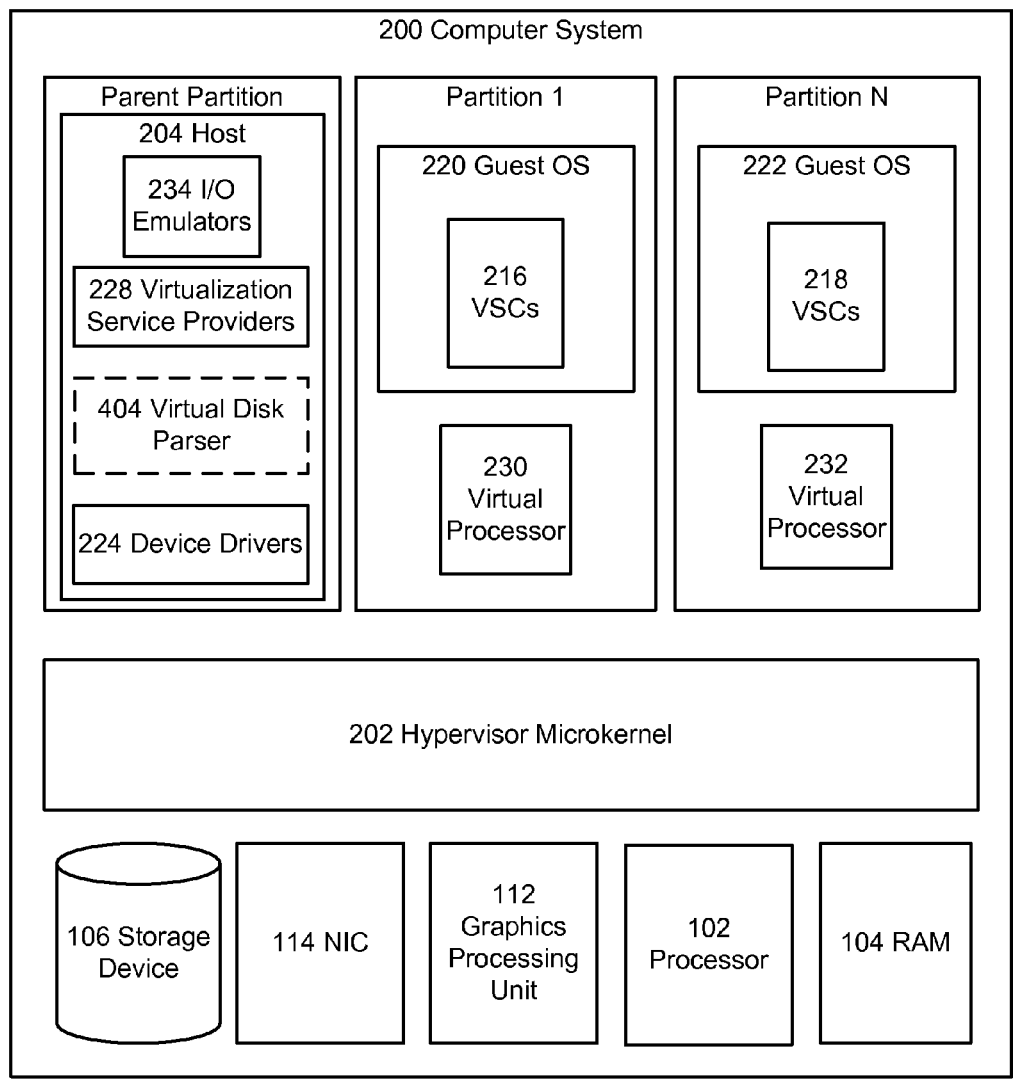
FIG. 2 depicts a high-level block diagram of an exemplary architecture for a virtualizing software program.

Turning to FIG. 2, illustrated is an exemplary virtualization platform that can be used to generate virtual machines. In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a stand-alone software product, a part of an operating system, embedded within firmware of the motherboard, specialized integrated circuits, or a combination thereof.

Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a logically contiguous working memory. In a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path, in that the drivers in the VM are designed to access IO services provided by the virtualization system rather than designed to access hardware.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
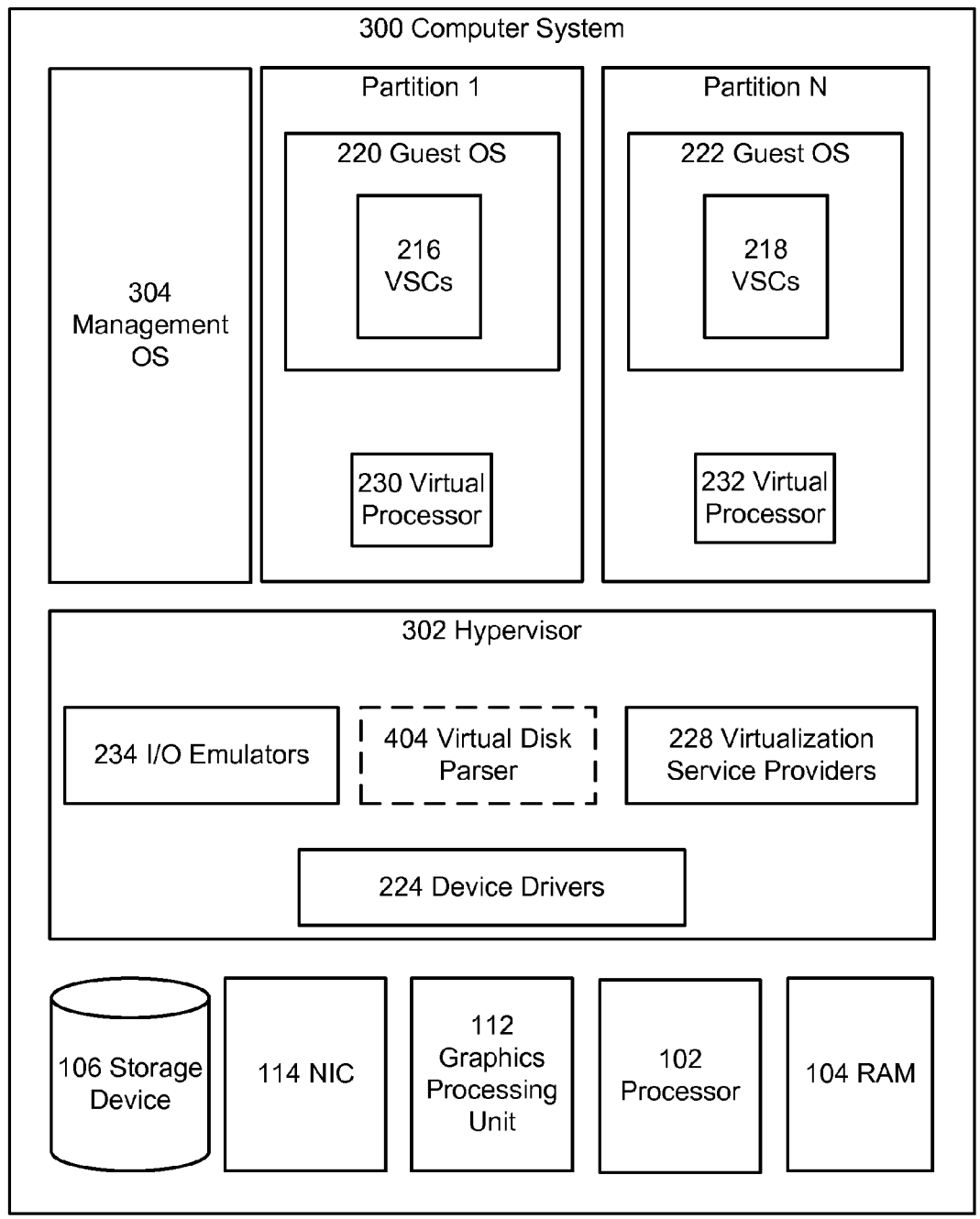
FIG. 3 depicts a high-level block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened IO path and includes the drivers for the physical hardware of the computer system. Hypervisor 302 of FIG. 3 can be a stand alone software product, a part of an operating system, embedded within firmware of the motherboard or a portion of hypervisor 302 can be effectuated by specialized integrated circuits.

Figure 4:
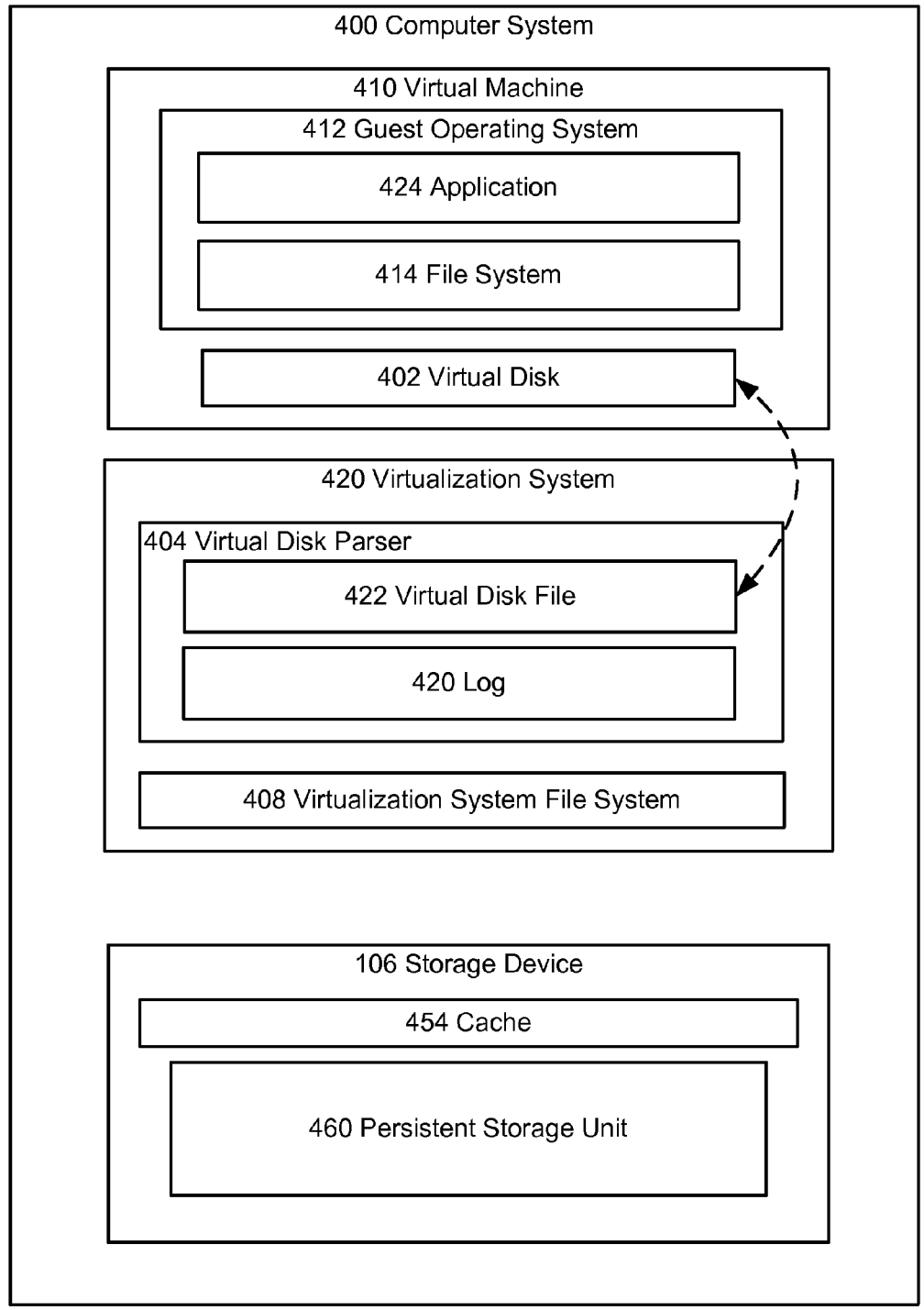
FIG. 4 depicts a lower-level block diagram of a computer system configured to effectuate a virtual disk.

Turning now to FIG. 4, it describes computer system 400, which illustrates a high-level block diagram of components that can be used to effect the techniques described in this document. Briefly, computer system 400 can include components similar to those described above with respect to FIG. 1 through 3. FIG. 4 shows virtualization system 420, which can be thought of as a high-level representation of the virtualization platform illustrated by FIG. 2 or FIG. 3. For example, virtualization system 420 can be though of as a high-level representation of the combination of features provided by hypervisor microkernel 202 and host 204. Alternatively, virtualization system 420 can be thought of as a high-level representation of hypervisor 302 and management OS 304. Thus, use of the term "virtualization system 420" throughout this document signals that the virtual disk techniques described in the following paragraphs can be implemented within any type of virtualization software layer or in any type of virtualization platform.

Virtual disk parser 404, which can be executable instructions in a specific example embodiment, can be used to instantiate virtual disks from virtual disk files and handle storage IO on behalf of a virtual machine. As shown by the figure, virtual disk parser 404 can open one or more virtual disk files such as virtual disk file(s) 406 and generate virtual disk 402.

Virtual disk parser 404 can obtain virtual disk file(s) 406 from storage device 106 via virtualization system file system 408. Briefly, virtualization system file system 408 represents executable instructions that organize computer files and data of virtualization system 420, such as virtual disk file(s) 406. Virtualization system file system 408 can store this data in an array of fixed-size physical extents, i.e., contiguous areas of storage on a physical storage device. In a specific example, an extent can be a cluster, which is a sequence of bytes of bits having a set length. Exemplary cluster sizes are typically a power of 2 between 512 bytes and 64 kilobytes. In a specific configuration, a cluster size can be 4 kilobytes.

When a request to open virtual disk file 406 is received, virtualization system file system 408 determines where the file is located on disk and issues an IO job to the disk device driver to read the data from one or more physical extents of the disk. The IO job issued by file system 408 determines a disk offset and length that describes the location of the persistent copy of virtual disk file 406 on storage device 106 and issues the IO job to storage device 106. Due to the semantics of how storage devices operate, a write IO job can be buffered in one or more levels of caches of volatile memory, represented by cache 454, until the circuitry of storage device 106 determines to access the location on the persistent storage unit 460, e.g., a platter, a flash memory cell, etc., and write the buffered bit pattern indicative of the new contents of the persistent copy of the virtual disk file(s) 406 to persistent storage unit 460.

Virtual disk parser 404 can obtain the bit pattern indicative of virtual disk file(s) 406 and expose the payload, e.g., user data, in the virtual disk file(s) 406 as a disk including a plurality of virtual disk extents. In an embodiment, these virtual disk extents can be a fixed-size block 512 kilobytes up to 64 megabytes in size and partitioned into a plurality of sectors; however, in another embodiment the virtual disk extents could be variable-sized extents. In an exemplary configuration, prior to booting guest operating system 412, resources related to an emulated or enlightened storage controller and emulated or enlightened aspects of a virtual disk are setup such that an emulated storage controller with memory mapped registers is effected within guest physical address space of the virtual machine 410. Boot code can run and boot guest operating system 412. Virtualization system 420 can detect an attempt to access this region of guest physical address space and return a result that causes guest operating system 412 to determine that a storage device is attached to the emulated storage controller. In response, guest operating system 412 can load a driver (either a paravirtualization driver or a regular driver) and use the driver to issue storage IO requests to the detected storage device. Virtualization system 420 can route the storage IO requests to virtual disk parser 404.

After guest operating system 412 is running it can issue IO jobs to virtual disk 402 via file system 414, which is similar to virtualization system file system 414 in that it organizes computer files and data of guest operating system 412 and applications installed on guest operating system 412. Guest operating system 412 can interact with virtual disk 402 in a way that is similar to how an operating system interacts with a physical storage device and eventually the IO jobs are routed to virtual disk parser 404. Virtual disk parser 404 can include logic for determining how to respond to the IO jobs in a way that emulates a physical storage device. For example, virtual disk parser 404 can read data from virtual disk file(s) 406 and write data to virtual disk file(s) 406. The data written to virtual disk file(s) 406 in turn is routed through virtualization system file system 408 and committed to a persistent copy of virtual disk file(s) 406 stored on or in persistent storage unit 460.

Figure 5A:
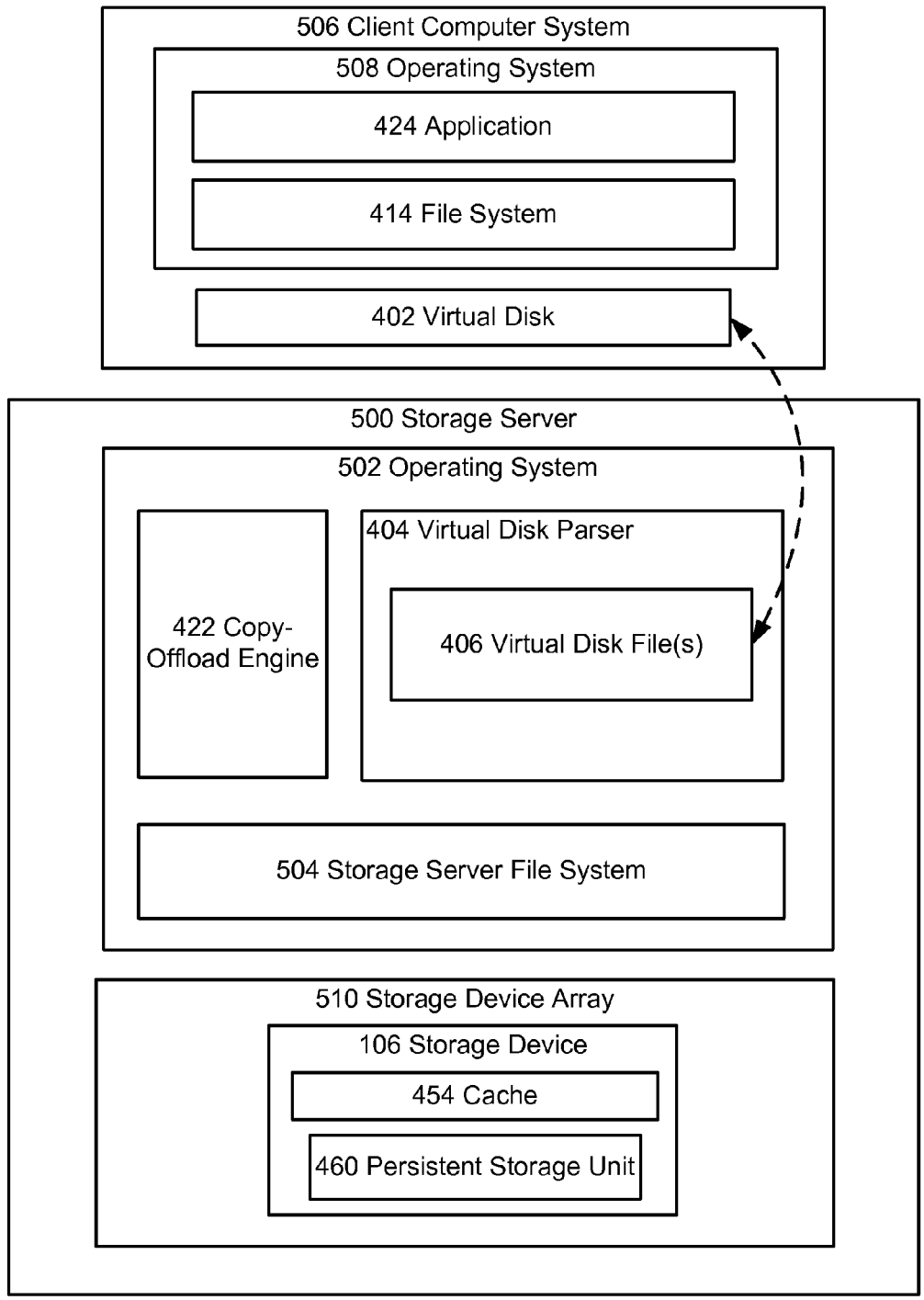
FIG. 5A depicts a lower-level block diagram of a computer system configured to effectuate a virtual disk.

Referring briefly to FIG. 5A, it illustrates an alternative architecture for implementing techniques described in this document. As shown by FIG. 5, virtual disk parser 404 can also be implemented in an operating system 502 such as an operating system offered by Microsoft®. In this example, virtual disk parser 404 can be configured to run on storage server 500, which could include components similar to computer system 100 of FIG. 1. In this example, storage server 500 could include an array of physical storage devices 510 and can be configured to make storage available to servers such that the storage appears as locally attached to operating system 508. Virtual disk parser 404 can operate the same as it was described with respect to FIG. 4; the difference being in this configuration read/write IO jobs issued by file system 414 can be routed over a network connection to virtual disk parser 404.

Figure 5B:
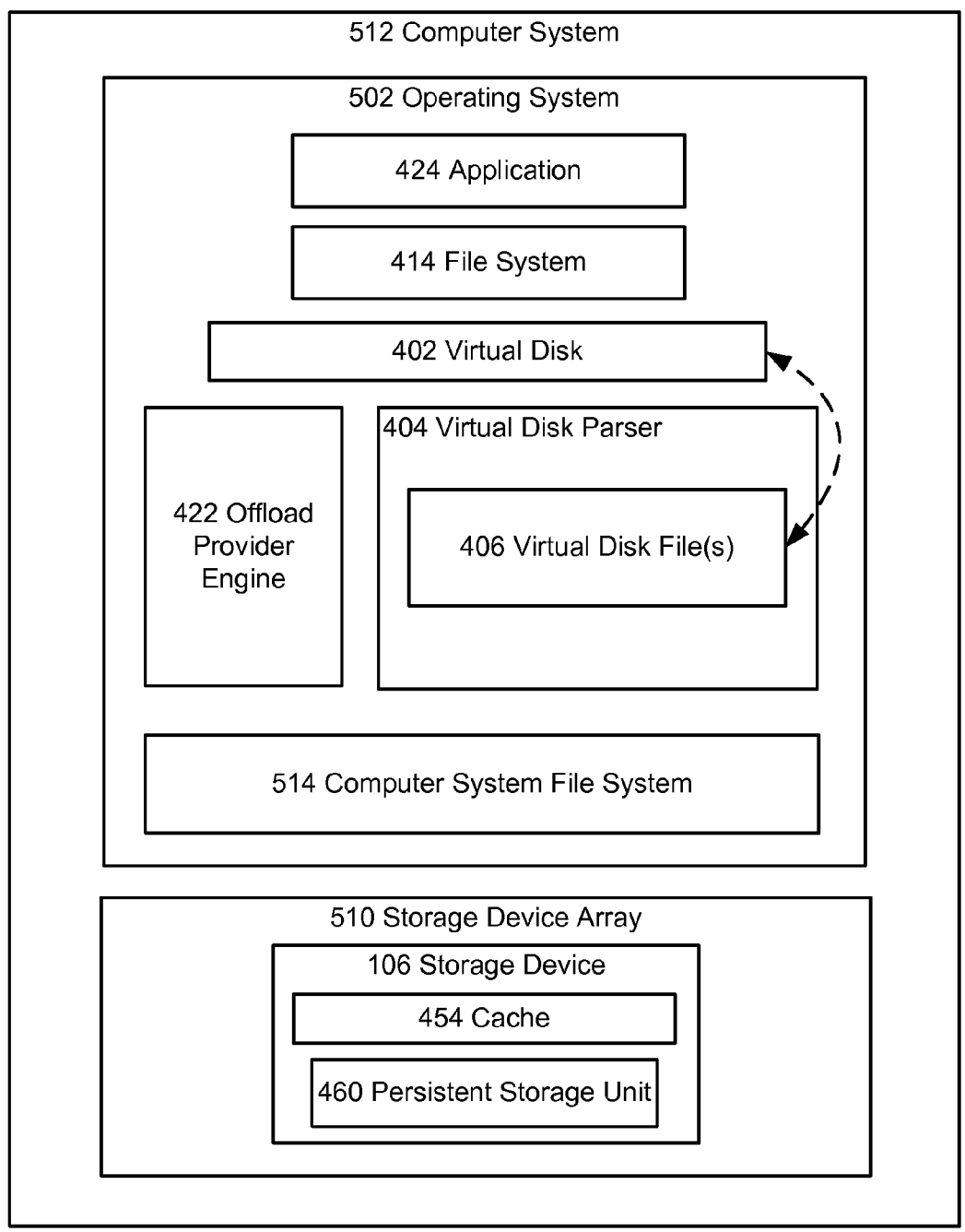
FIG. 5B illustrates a lower-level block diagram of a computer system configured to effectuate a virtual disk.

Referring briefly to FIG. 5B, it illustrates yet another architecture for implementing techniques described in this document. FIG. 5B is similar to FIG. 5A in that virtual disk parser 404 is implemented in operating system 502 and computer system 512 could include components similar to computer system 100 of FIG. 1. The difference in this example; however, is that the figure illustrates a loopback-attached virtual disk 402. File system 414, including applications such as application 424 can be stored in virtual disk 402 and virtual disk file(s) 406 can be stored in computer system file system 514.

Figure 6:
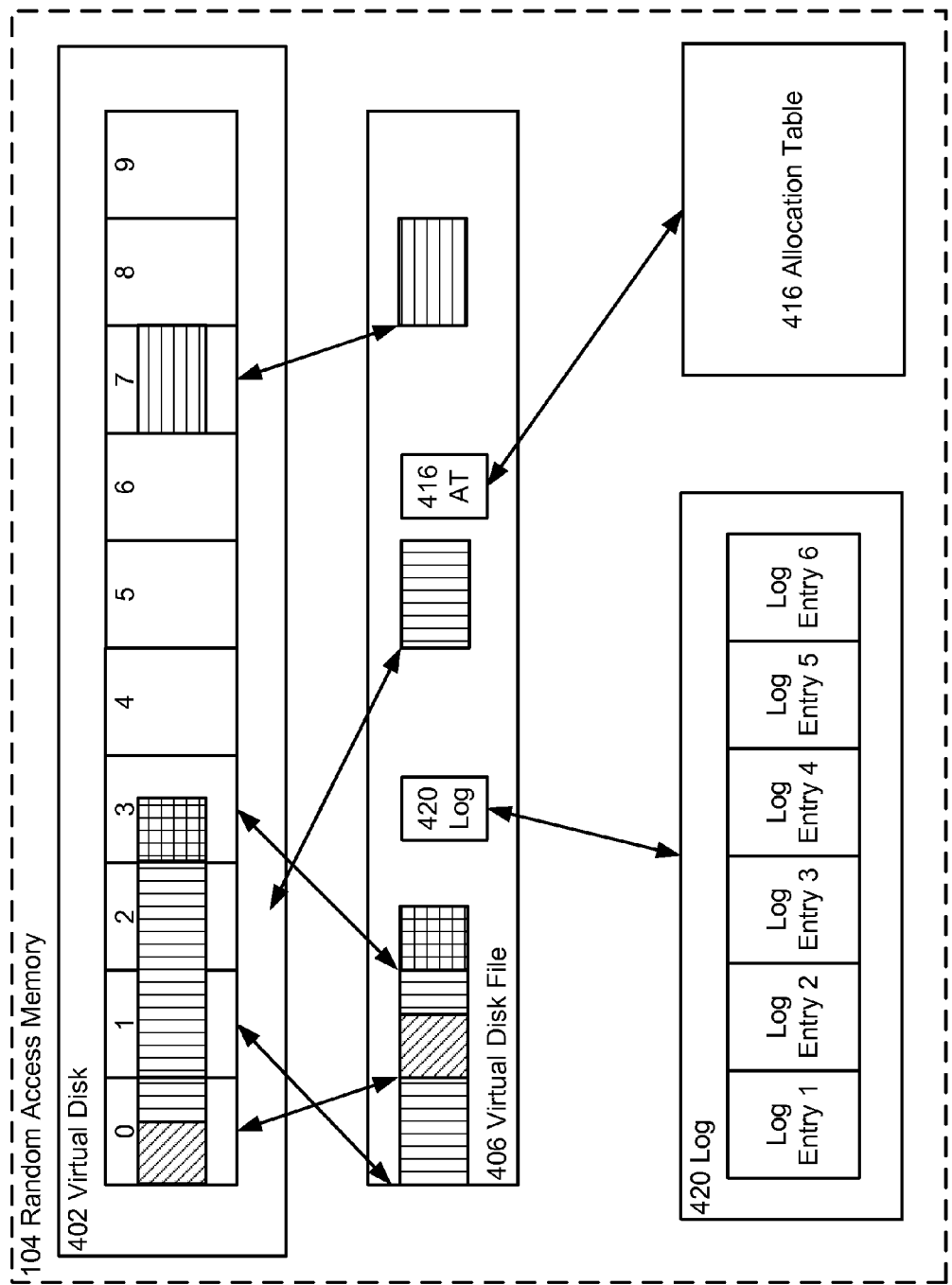
FIG. 6 depicts a high-level illustration of the relationship between a virtual disk and a virtual disk file.

Turning to FIG. 6, it illustrates a virtual disk described at least in party by virtual disk file 406. As shown by the figure, virtual disk 402 can include N extents of storage (where N is an integer greater than 0) and in this specific example virtual disk 402 includes 10 extents. Virtual disk 402 is illustrated as including the bit patterns for different files and data for guest operating system 412, which are differentiated by the different patterns within the virtual disk extents.

Since virtual disk 402 is not a physical storage device, the underlying payload data for the virtual disk extents can be "described by," i.e., stored in, different sections within virtual disk file 406. For example, virtual disk block 1 is described by a portion that defined by a virtual disk file offset value 0 or the first offset that can be used to store payload data. Allocation table 416, which can be stored in random access memory while computer system 400 is in operation, can be persisted in virtual disk file 406 in any section and can span multiple sections. Briefly, allocation table 416 can include information that links virtual disk extents to sections of virtual disk file 406. For example, allocation table 416 can store virtual disk block numbers and information that defines the virtual disk file byte offsets that define the section of virtual disk file 406 that stores the data. The arrows signify the relationships stored in allocation table 416.

A problem exists in that when a change to allocation table 416 or other metadata is made to a virtual disk file there is no guarantee that the change will be persisted by persistent storage unit 460 until cache 454 is flushed. If the virtual disk file is not properly closed before a metadata update is persisted, such as when power is lost unexpectedly, all the metadata entries stored in a sector of persistent storage unit 460 could be corrupted and, especially if the metadata is for allocation table 416, the information linking multiple virtual disk extents to virtual disk file 406 could be lost. As such, loss of a single sector could cause many virtual disk extents to become unusable.

In exemplary embodiments, log 420 can be used to reduce the chance that corruption of a section of the virtual disk file metadata corrupts multiple sections of virtual disk 402. As such, virtual disk parser 404 can generate log entries that include bit patterns indicative of a change made to metadata of virtual disk file 402 and log them within log 420. In the instance that the virtual disk file is not closed properly, when virtual disk parser 404 is restarted log 420 can be used to replay changes to the metadata.

As shown by the figure, log 420 can be built as an ordered sequence of log entries (log entries 1-6 in the illustrated example). Each log entry can include a sequence number that identifies whether it is the first, second, third, etc., log entry. In addition, the random access memory used to store log 420 during runtime can be used as a circular buffer by virtual disk parser 404. Thus, when log 420 is full, virtual disk parser 404 can begin overwriting older log entries at the beginning of log 420. Since earlier entries can be overwritten and virtual disk parser 404 sequentially orders them, virtual disk parser 404 could overwrite log entry 1 with log entry 7, overwrite log entry 2 with log entry 8 and so on and so forth.

In an exemplary embodiment, virtual disk parser 404 can be configured to apply log entries to virtual disk file 406 in response to a flush. Briefly, a flush is a request that directs a storage device to write the contents of its internal caches to persistent storage. Since storage devices do not signal when a bit pattern described by an IO job is persisted, there is no guarantee that an IO job is stored to persistent storage device 460 unless a flush is issued. In an exemplary configuration, a side effect of the way virtual disk parser 404 generates logs and updates virtual disk file 406 is that the act of writing a log entry describing a change to the metadata can be equivalent to writing the change to virtual disk file 406. Because of this, the changes can be applied to virtual disk file 406 in batches to reduce the impact on performance caused by applying individual changes to virtual disk file 406. Thus, in this exemplary embodiment changes to virtual disk file 406 can be delayed and written together in response to, for example, a flush. In a specific example, where the metadata is stored in allocation table 416, virtual disk parser 404 can be configured to write log entries to log 420 and update the in-memory copy of allocation table 416; determine that a flush occurred; and update virtual disk file 406. The update to virtual disk file 406 in turn causes IO jobs indicative of the changes described by the log entries that were just flushed to be sent to storage device 106 so that they can be applied to a persistent copy of virtual disk file stored in persistent storage unit 460.

In an exemplary embodiment, virtual disk parser 404 can overwrite log entries with new log entries when the log entries has been successfully stored by persistent storage unit 460. As stated above, since IO jobs issued to storage device 106 may be stored in one or more levels of volatile memory, e.g., cache 454, and since some storage devices do not report when IO jobs are completed, in an exemplary configuration virtual disk parser 404 can be configured to overwrite log entries that have been flushed to persistent storage unit 460.

Figure 7:
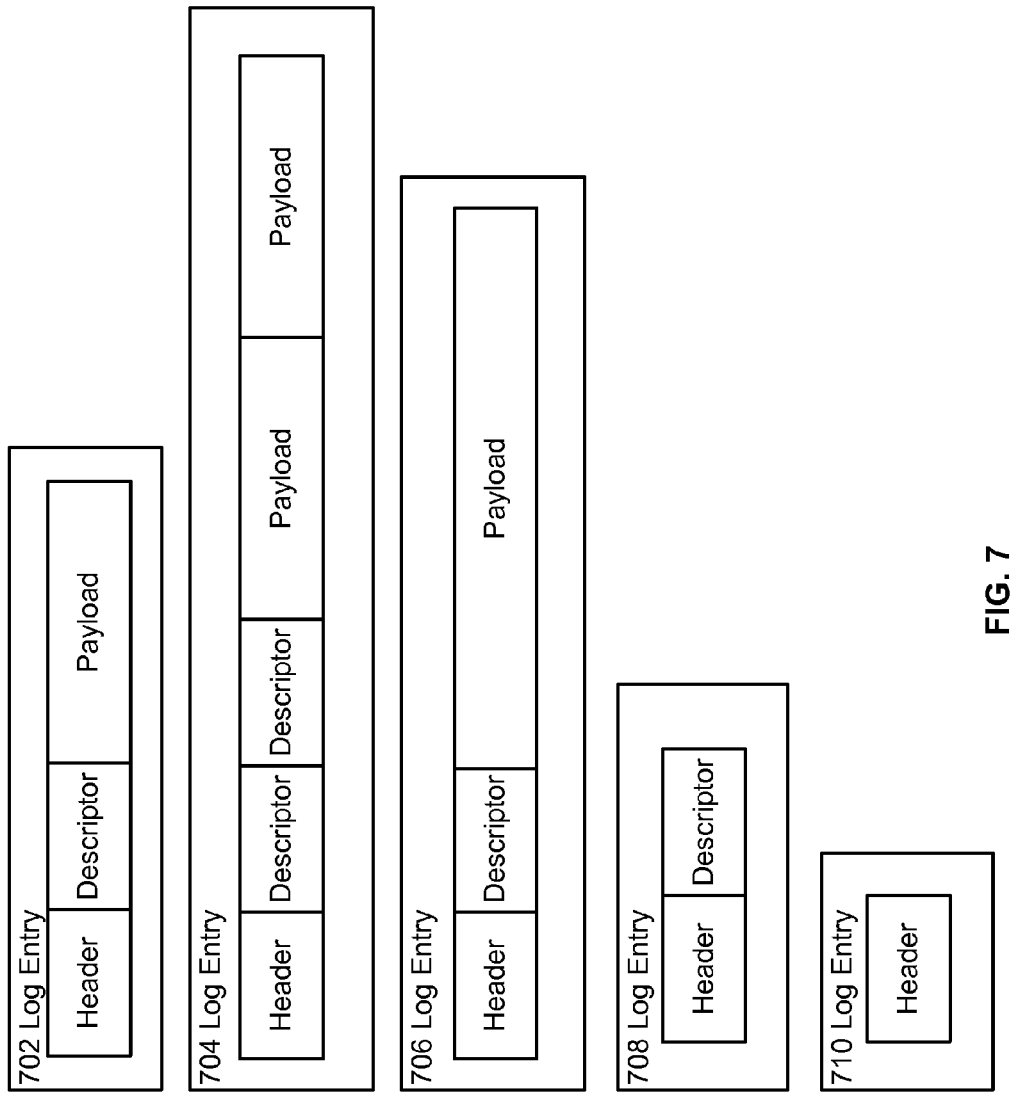
FIG. 7 depicts exemplary log entry formats.

Turning to FIG. 7, it illustrates different log entry formats. In an exemplary embodiment, virtual disk parser 404 can be configured to write log entries that are similar to log entry 702, 704, 706, and/or 708. However, the disclosure is not limited to using log entries that have a structure similar to any of the log entries depicted by FIG. 7. As shown by FIG. 7, each log entry can include a header. The header can include a sequence number of the log entry, e.g., log number 1 to M (where M is an integer greater than 1), a unique identifier that identifies that the log entry is part of the current run, i.e., information that indicates that the log is for this runtime instance as opposed to a pervious time virtual disk 402 was instantiated, and an identifier for "tail," i.e., the oldest log entry in the log that has not been flushed, which is described in more detail in the following paragraphs. In addition, in an optional embodiment, virtual disk parser 404 can write end of file (EOF) information, e.g., the virtual disk file byte offset indicative of the end of virtual disk file 406, to each log entry. The EOF information can be used to repair the length of virtual disk file 406 in the event where the EOF of virtual disk file 406 does not match the EOF identified by log 420.

As shown by FIG. 7, some log entries include a header and a descriptor. The descriptor section can include a reference to a virtual disk file offset for where in virtual disk file 406 the payload, i.e., a bit pattern, should be written. In an exemplary embodiment, the payload can include a sector's worth of data. For example, if storage device 106 use 4 kb sized sectors, the payload in each log entry can be a 4 kb update, i.e., bit pattern, for virtual disk file 406. Log entry 702 and 706 illustrate that the payload of a log entry can be different depending on the sector size of the underlying storage device, e.g., storage device 106. For example, log entry 702 may describe a 4 k update whereas log entry 706 may describe an 8 k update.

Log entry 704, on the other hand, includes multiple descriptors and multiple payload bit patterns. Log entry 704 illustrates that exemplary log entries can describe updates to multiple sectors. Virtual disk parser 404 may be configured to create such a log entry when the updates are required to be committed at the same time. A specific example of such an update is one where virtual disk parser 404 data is moved from one virtual disk block to another and virtual disk parser 404 changes the information linking the virtual disk extents to virtual disk file 406 rather than copying the payload in a section of the virtual disk file to another section.

Log entry 708 illustrates that in an exemplary embodiment a log entry may not include a payload; rather, the descriptor may include a virtual disk file offset and an identifier that indicates that the payload for the sector is all zeros, all ones, etc. For example, virtual disk parser 404 may determine to modify a portion of virtual disk file to include all zeros, e.g., to extend the end-of-file. In this instance, virtual disk parser 404 can generate a log entry that includes an identifier that can be a substitute for the payload. This way the log entry will take less space within log 420.

A log entry can also be similar to log entry 710. This type of log entry can be used to update the tail position, which is described in more detail in the following paragraphs. Briefly, in the instance where log 420 is full or close to being full and log entries cannot be overwritten, i.e., the log entries have not been flushed to persistent storage unit 460, a log entry similar to log entry 710 can be used to advance the tail. In a specific example of how this could work, virtual disk parser 404 can determine that log 420 is full or is close to being full by determining how much free space is available within log 420 and comparing the value to a threshold. After determining that log 420 is full or is close to being full, virtual disk parser 404 can determine that an earlier entry cannot be overwritten by determining that the entry has not been flushed. Virtual disk parser 404 can then issue a flush to virtualization system file system 408 or storage server file system 504. After completion of the flush, virtual disk parser 404 can generate a log entry that is similar to log entry 710 and write information within it that indicates that a flush occurred and that this entry is the new tail (this aspect is described in more detail in conjunction with the description of FIG. 8).

In addition to the foregoing, data can be stored in the log entries in a certain way in order to signal to virtual disk parser 404 that a sequence of bytes within log 420 is a single, valid, log entry. For example, the header can include a checksum or other data that can be used to validate a log entry and a unique identifier to identify it as the header. The descriptor can also be assigned a unique identifier that identifies it as associated with the header and a copy of the descriptor's unique identifier can be placed within, for example, the first byte of the payload section and the first byte of the payload can be stored in the descriptor. Thus, the actual payload can be a combination of the payload in the payload section, minus the first byte, plus a byte stored in the descriptor.

In an embodiment, log 420 can be used as both a log and a checkpoint record. Virtual disk parser 404 can add an identifier of the "tail," which is an identifier associated with the oldest log entry stored in the log that has not been flushed, to each log entry generated. The identifiers can be used after a crash by virtual disk parser 404 to determine what log entries have been applied to the on-disk copy of virtual disk file 406 and what log entries should be replayed.

Figure 8:
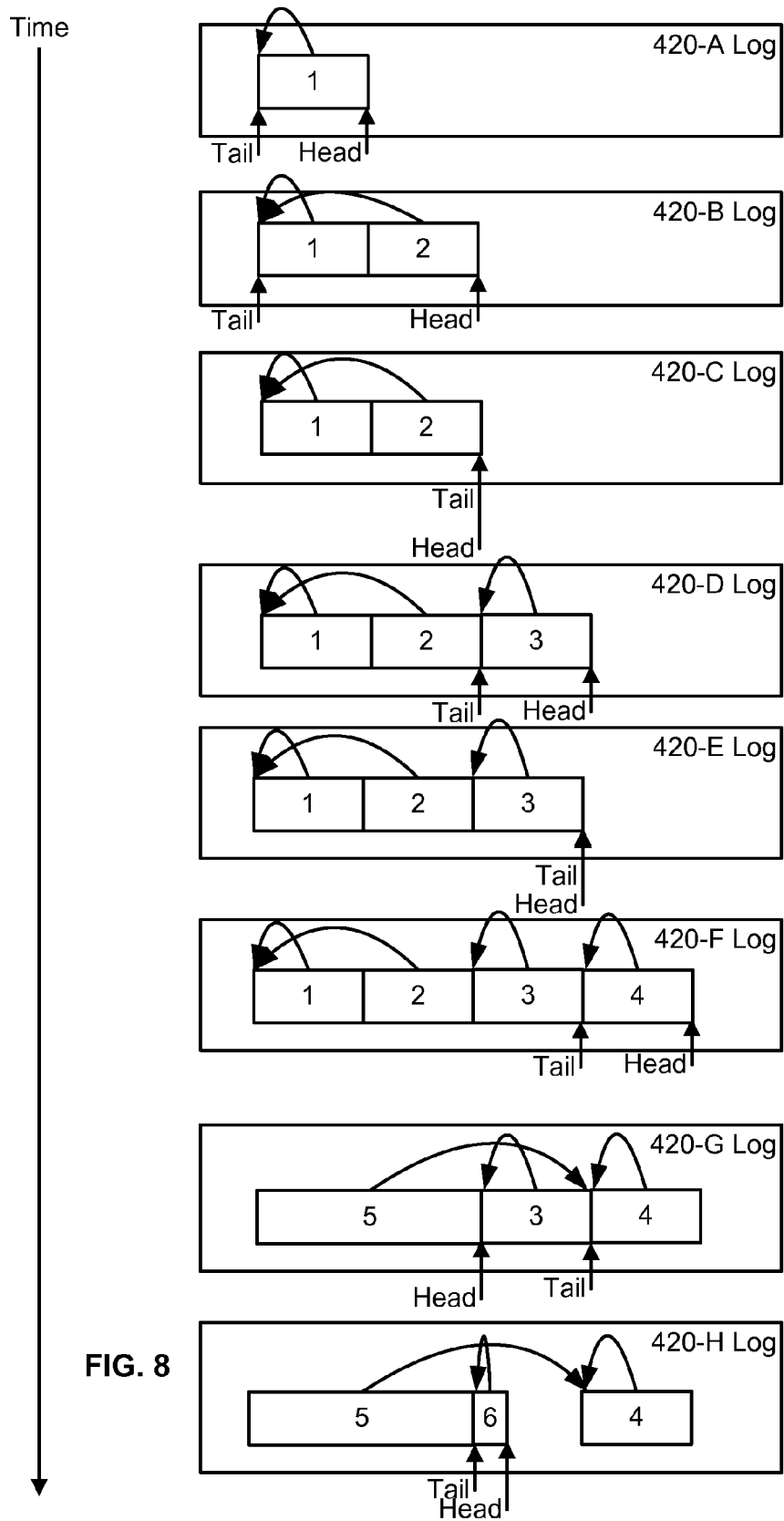
FIG. 8 depicts a specific example of writing log entries to an exemplary log over a time period.

Turning now to FIG. 8 it describes how virtual disk parser 404 can write to log 420 over time. In this specific example, log 420 is shown at eight points of time (420-A through 420-H). Prior to the time period illustrated by log 420-A, virtual disk parser 404 can open virtual disk file 406 and virtual disk 402 can be instantiated. In a specific example, virtual disk 402 can be instantiated within virtual machine 410, i.e., computer system 400 can be configured to route IO jobs from virtual machine 410 to virtual disk parser 404 and emulate the presence of a storage device within virtual machine 410. In another configuration, operating system 508 can boot of virtual disk 402 and begin to run on client computer system 506.

Suppose that an IO job that results in a change to metadata of virtual disk file 406 is issued. This in turn causes virtual disk parser 404 to write a bit pattern indicative of a change to the metadata in virtual disk file 406. In this case, virtual disk parser 404 can generate a bit pattern for a sector-sized portion of virtual disk file that the change is to be applied to and generate log entry 1. As an aside, a reason for why a sector-sized update is used is because a sector may be the amount of data that storage device 106 may commit to persistent storage unit 460 in a single transaction. Thus, even if the metadata change is a few bytes of a in size, the bit pattern representing the change can include the update and the remainder of the data already stored in virtual disk file 406. Returning to the example, virtual disk parser 404 can determine the identity of the tail (the oldest log entry that has not been committed to storage device 106 since the last flush) by checking a memory pointer that identifies the tail. In this example, the tail has been initialized to the beginning of log 420. Consequently, virtual disk parser 404 can add an identifier the initialization point within log entry 1 (which is illustrated by the curved arrow pointing from the middle of log entry 1 to its beginning); write log entry 1 to log 420; and issue an IO job indicative of the change to log 420 to storage device 106 to update the on-disk copy of log 420. In an example embodiment, the identifier could be the sequence number of log entry 1, it could be the byte offset within log 420 that is indicative of the first sector of log entry 1, etc. In addition, if the update was to allocation table 416, virtual disk parser 404 can update an in-memory copy of allocation table 416 to include the change.

Continuing with the description of FIG. 8 and turning to log 420-B, suppose virtual disk parser 404 receives another IO job that results in a change to metadata stored in virtual disk file 406. For example, suppose a change to allocation table 416 is made to link a virtual disk block to a section of virtual disk file 406. In response, virtual disk parser 404 can generate log entry 2 that includes a payload including a bit pattern for virtual disk file 406 that is indicative of the information that links the virtual disk block to the section of the virtual disk file 406 as well as data from the sector that is already on disk, and virtual disk parser 404 can determine that the identity of the oldest unflushed log entry is at the beginning of log 420, also known as log entry 1. For example, virtual disk parser 404 can check a memory pointer that points to the beginning of the oldest unflushed log entry; add an identifier to log entry 2; write log entry 2 to log 420; and issue an IO job to update the on-disk copy of log 420. Both entry 1 and 2 in this example are checkpoint records because they both explicitly identify the oldest unflushed log entry.

Turning to log 420-C, suppose now that a command to initiate a flush operation is processed. For example, suppose virtual disk parser 404 determines to issue a flush command to storage device 106 based on the expiration of a timer, or because a predetermined amount of space used to store unflushed log entries is exceed. Alternatively, suppose a flush is issued by file system 414 of virtual machine 410. Regardless of what process initiated the flush, virtual disk parser 404 be configured to use the initiation of a flush procedure to persist log entries and update the on-disk copy of virtual disk file 406. For example, in response to processing command to initiate a flush, virtual disk parser 404 can issue a flush that causes storage device 106 to write the contents cache 454 to persistent storage unit 460. This in turn ensures that the IO jobs indicative of log entry 1 and log entry 2 are persisted. Virtual disk parser 404 can update a pointer in memory to the location indicative of the first virtual disk file offset for where the next log entry will be written, i.e., log entry 3.

Turning now to log 420-D, another update can be made to virtual disk file metadata that results in a change to virtual disk file 406. Similar to the operational procedure described above, virtual disk parser 404 can generate log entry 3 and virtual disk parser 404 can determine the identity of the oldest log entry that is both uncommitted, i.e., has not been committed to storage device 106 during a flush operation, and unapplied, i.e., has not been applied to virtual disk file 406. For example, virtual disk parser 404 can check the memory pointer that points to the file offset indicative of the end of log entry 2 and add an identifier for log entry 3 to log entry 3, e.g., within the header of log entry 3. The fact that the memory pointer has moved passed both entry 1 and 2 in this example indicates that both log entry 1 and 2 have been committed to disk. Virtual disk parser 404 can then write log entry 3 to log 420 in RAM 104 and issue an IO job indicative of log entry 3 to storage device 106.

Turning to log 420-E, suppose now that another command to initiate a flush operation is processed. In response to processing a request to issue a flush, virtual disk parser 404 can issue the flush and cause storage device 106 to write the contents of cache 460 to disk. After storage device 106 sends an acknowledgment indicating that the flush was completed, virtual disk parser 404 can update the tail pointer to point to the file offset indicative of the virtual disk file byte offset for the next log entry, i.e., log entry 4.

Turning now to log 420-F, another update can be made to virtual disk file metadata that results in a change to virtual disk file 406. Similar to the operational procedure described above, virtual disk parser 404 can generate log entry 4 and virtual disk parser 404 can determine the identity of the oldest log entry that has not been flushed, e.g., log entry 4 in this example; add an identifier for log entry 4 to log entry 4 and write log entry 4 to log 420.

Suppose that the size of log 420 is limited and is being treaded in a circular manner. Log 420-G shows that virtual disk parser 404 can be configured to overwrite older flushed entries with new entries. In this example, virtual disk parser 404 is shown to have received a change to metadata that is larger than the pervious changes. For example, suppose log entry 5 is includes two payloads. Virtual disk parser 404 can determine that there is not enough space to write log entry 5. In response to this determination, virtual disk parser 404 can determine whether there are flushed log entries in log 420 by checking the tail pointer and determining that there is space in the log 420 before the tail pointer virtual disk file offset value. Virtual disk parser 404 can be configured to then generate log entry 5 and determine that the oldest unflushed log entry is log entry 4 and add an identifier for log entry 4 to log entry 5 before writing log entry 5 to log 420. As is shown by the figure, in this case the identifier points to a log entry that looks as if it was written to log 420 after log entry 5. However, and described in more detail in conjunction with the description of FIG. 9, virtual disk parser 404 can determine that log entry 5 was in fact written after log entry 4.

When the head pointer reaches the tail pointer a situation is created where there are no flushed log entries, thus, virtual disk parser 404 cannot overwrite anymore entries. In this situation, virtual disk parser 404 can be configured to create space within log 420 by writing log entries that are used to update the tail. As shown by log entry 420-H, virtual disk parser 404 may issue a flush; issue IO jobs indicative of changes described by the flushed log entries (log entries 4 and 5 in this example) to storage device 106 to update the on-disk copy of virtual disk file 406; generate log entry 6, which may look similar to log entry 610 of FIG. 6 in that it includes a header; add an identifier for log entry 6 to log entry 6; and write the log entry to log 420. Consequently, virtual disk parser 404 may now use the space previously storing the remainder of log entry 3, 5, and 5 to store subsequent log entries.

Figure 9:
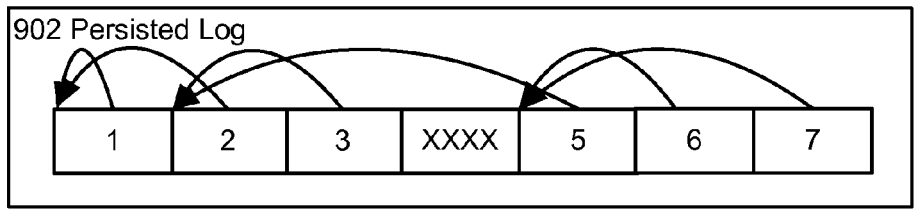
FIG. 9 depicts a specific example of selecting a sequence of log entries can be selected for replay.
Figure 9:
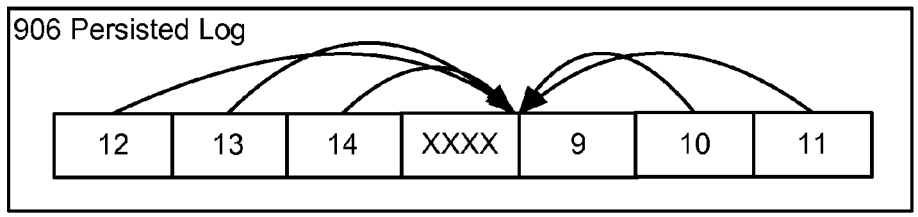

Turning now to FIG. 9, after a log entry is created virtual disk file 406 may be improperly shut dude due to a power failure or a crash. When virtual disk parser 404 reopens virtual disk file 406, persisted log 902 or 906 may be encountered. Exemplary persisted log 902 or 906 may not have been generated from the exemplary high-level overview of FIG. 8 and persisted log 902 and 906 are part of a different example. Virtual disk parser 404 can be configured to scan these entries; determine what log entries have been applied to virtual disk file 406 and what log entries can be replayed based on the tail pointers stored in the persisted log entries.

Log 902 is illustrated as including 6 valid log entries and one entry that includes corrupt data, i.e., log entry 4. After detecting log 902, virtual disk parser 404 can be configured to scan log 420 to locate the newest valid log entry and apply the sequence, i.e., zero or more ordered log entries that the newest valid log entry is a part of. Briefly, virtual disk parser 404 can determine the sequence that the newest valid log entry belongs to by selecting a group of log entries where each log entry includes an identifier of the tail, other than the log entry identified as the tail, which can include an identifier to itself or some other log entry.

Referring to log 902 in conjunction with table 904, virtual disk parser 404 can walk log 902 and populate table 906. After table 906 is selected, virtual disk parser 404 can select the sequence that includes the newest valid log entry. For example, virtual disk parser 404 can be initialized so that the sequence is set to 0 and a discontinuity is set to the beginning of log 902. Briefly, a discontinuity is a spot within virtual disk file where the data does not represent a valid log entry. For example, the data at a discontinuity could be an entry from a different runtime, part of an entry, random data, etc. Virtual disk parser 404 can track the most recent discontinuity point and use its location to determine whether a given sequence includes all valid entries.

Virtual disk parser 404 can read log entry 1 and determine whether it is a valid log entry. For example, virtual disk parser 404 can check information in the header, descriptor, and/or its payload and determine whether it conforms to a format that is indicative of a valid log entry. Once a determination is made that log entry 1 is valid, virtual disk parser 404 can read information stored therein and determine what the tail pointer was when log entry 1 was committed. In this example, log entry 1 points to itself. Consequently, virtual disk parser 404 can store information that indicates that a sequence of events that includes the newest valid log entry starts at log entry 1 and includes log entry 1. Since the discontinuity was initialized to 0 and log entry 1 is valid, virtual disk parser 404 can keep the discontinuity offset equal to 0.

Virtual disk parser 404 can then scan log entry 2 and determine that it is valid and points to log entry 1. In response to this determination, virtual disk parser 404 can determine a sequence that includes the most recent valid log entry to be 1 through 2 and store this information in table 904. In this example, since virtual disk parser 404 has started scanning at the beginning the "newest" log entry thus far is log entry 2. Virtual disk parser 404 can read log entry 3 and determine that it is valid and that it indicates that the tail is located at the file offset indicative of log entry 2. In this example, virtual disk parser 404 can determine that log entry 3 is the newest valid log entry detected, based on its sequence number, a timestamp, etc., and determine that the sequence begins at log entry 2 due to the presence of an identifier for log entry 2 being present within log entry 3. As an aside, the presence of log entry 3 pointing to log entry 2 (as opposed to 1) indicates that a flush operation occurred sometime after log entry 2 was generated but before log entry 3 was created. Consequently, log entry 3 was created after log entry 1 had been committed to the on-disk copy of virtual disk 406.

Turning to the space that should include log entry 4, virtual disk parser 404 can scan this section of log 420 and determine that it does not describe a valid log entry. For example, it includes a wrong session identifier, an invalid checksum or is random data. In response to this determination, virtual disk parser 404 can update the discontinuity point to the file offset that represents the first sector of log entry 5 and leave the sequence value blank since this entry does not describe a valid sequence.

Similar to the preceding operations, virtual disk parser 404 can scan log entry 5 and determine that it is valid and points to log entry 2. In this example, virtual disk parser 404 can be configured to determine that the sequence begins at log entry 2 due to the present of an identifier for log entry 2 within log entry 5. Since each log entry in the sequence (2-5) is not a valid entry, virtual disk parser 404 can exclude this sequence from consideration. However, since log entry 5 is valid and is the most recent entry, virtual disk parser 404 can store it a candidate sequence for replay. One reason for excluding a sequence with an invalid entry is because virtual disk parser 404 can be configured to apply the payloads of each log entry in the selected sequence and replaying a sequence with bad data could cause the virtual disk file 406 to become unusable.

Continuing with explanation of the example, virtual disk parser 404 can read log entry 6 and determine that it is valid and points to log entry 5. In response to this determination, virtual disk parser 404 can determine that the newest log entry is log entry 6; that log entry 6 includes the identifier for log entry 5; and the sequence 5-6 does not include a discontinuity. In response to determining this information, virtual disk parser 404 can update the "sequence" value in table 904 to identify that a sequence 5 through 6 is now the candidate sequence for replay. After updating table 904, virtual disk parser 404 can read log entry 7 and determine that it is valid and points to log entry 5. In response to this determination, virtual disk parser 404 can determine that the newest log entry is log entry 7; that log entry 7 includes the identifier for log entry 5; and the sequence 5, 6, 7, does not include a discontinuity. In response to determining this information, virtual disk parser 404 can update the "sequence" value in table 904 to identify that a sequence 5 through 7 is now the candidate sequence for replay.

Since log 7 is the last entry stored in persisted log 902 and describes the most recent valid sequence, virtual parser 404 can select the candidate sequence (in this example log entries 5-7) and apply their payloads to virtual disk file 406. In an exemplary embodiment, virtual disk parser 404 can apply the changes by reading the descriptor and payload of each log entry and writing the payload to the file offset identified in the descriptor. For example, if the descriptor includes a file offset of 4096 and the payload is 4 kb, virtual disk parser 404 can write the 4 kb payload starting at file offset 4096.

Continuing with the description of FIG. 9, and turning to persisted log 906 it illustrates an exemplary persisted log 906 and the operations executed to populate table 808 during a first and second pass of persisted log 906. Similar to table 904, table 908 can be initialized to start at 0. When virtual disk parser 404 scans log entry 12, it can determine that it is valid and that it includes an identifier for the tail that points to log entry 9, an entry that has not yet been encountered by virtual disk parser 404. Consequently, virtual disk parser 404 can determine that the newest log entry is log entry 12; that log entry 12 includes the identifier for log entry 9; and that the sequence 9 to 12 includes a discontinuity, namely the log entries indicative of log entry 10 and 11. In response to determining this information, virtual disk parser 404 can update the "sequence" value in table 904 to identify that a sequence 12 is by itself the candidate sequence for replay.

The remainder of table 908 can be populated as virtual disk parser 404 scans log entries of log 906 and when the end is reached virtual disk parser 404 can be configured to rescan each entry again in order to adjust table 908 to account for the circular nature of log 906. In this example, when log entry 12 is reread, virtual disk parser 404 can determine that it is valid and that it includes an identifier for the tail that points to log entry 9 and that the sequence does not include a discontinuity. As shown by the figure, virtual disk parser 404 can determine that sequence 9 through 14 can be replayed because it includes the newest valid entry (14) and each log entry in the sequence (9-14) is valid.

Figure 10:
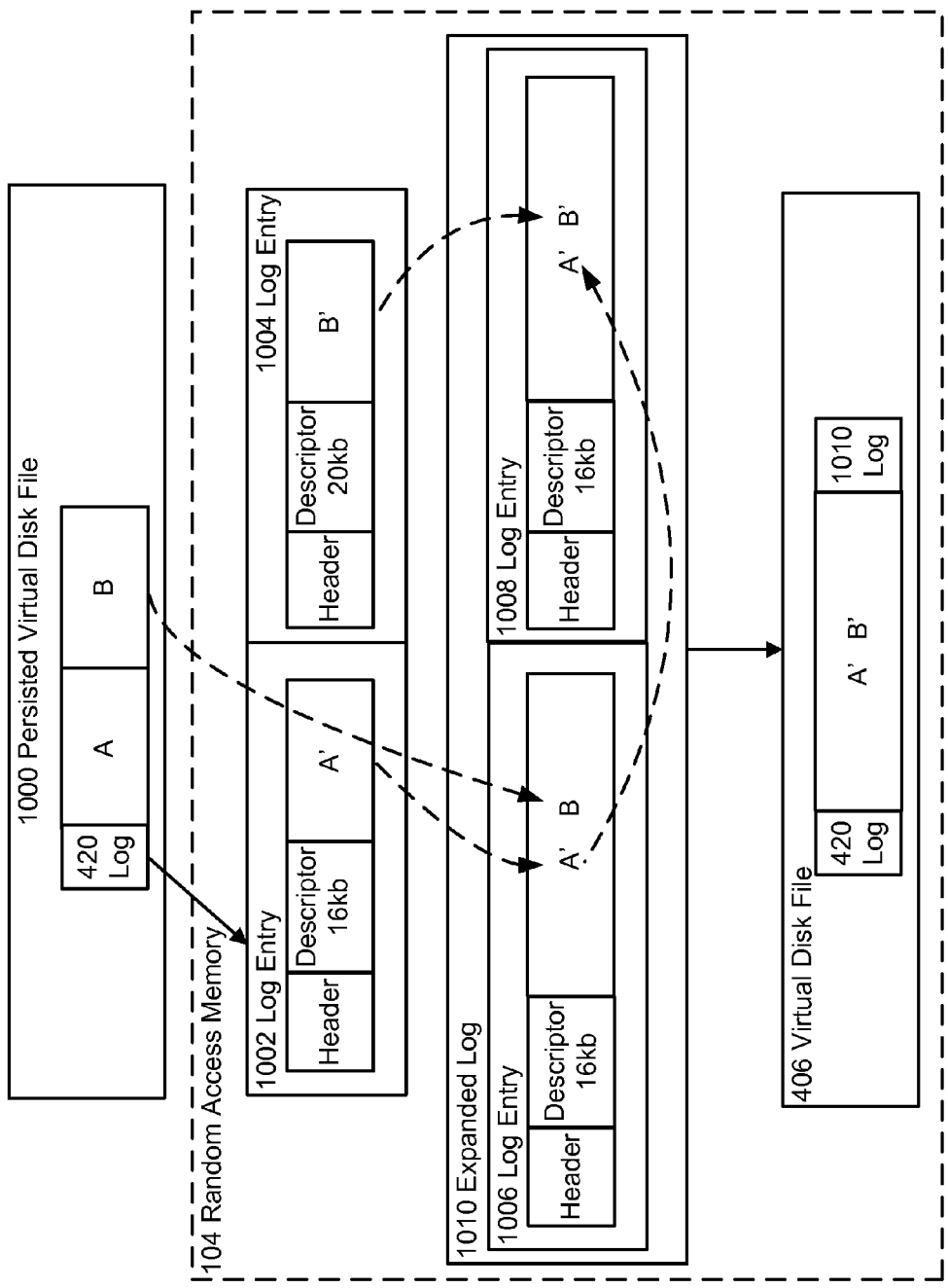
FIG. 10 depicts a specific example of how an expanded log can be generated.

Turning now to FIG. 10, it illustrates a technique for expanding the size of the log entries to account for a change to the sector size used by the underlying storage device. For example, virtual disk file 406 may be copied to a new computer system that includes a storage device with a larger sector size. If the underlying storage device is changed and includes larger sector sizes, virtual disk parser 404 can expand the payload stored by each log entry to match the sector size. In this regard, log entries can continue to be aligned with the underlying storage device.

Generally, when virtual disk parser 404 opens virtual disk file 406 and determines that the sector size has expanded, virtual disk parser 404 can be configured to generate a new log and convert the log entries stored in the old log into expanded log entries. Once the expansion process is completed virtual disk parser 404 can be configured to determine whether any log entries need to be replayed; replay the log entries; and then enter a runtime operation mode and execute operations similar to those described with respect to FIG. 7.

In an embodiment, the expansion process can include determining the difference between the old sector size and the new sector size and use this information to create log entries that are equivalent to the old log entries. For example, virtual disk parser 404 can divide the virtual disk file by the new sector size and determine where each new sector will begin. For the first entry in the new log, virtual disk parser 404 can determine from the descriptor where the old log entry will be located in the expanded sector and create a payload writing the payload of the entry to where it would be located within the new sector and filling the remainder of the payload with data from disk. For each subsequent log entry, virtual disk parser 404 can create an expanded entry including the payload and determine whether a previously generated expanded log entry describes a change to this sector. In the example that it does, virtual disk parser 404 can copy the payload from the previously generated expanded entry or entries and copy any remainder from disk.

In a specific example, suppose that virtual machine 410 is migrated from a computer system that includes a storage device that uses 4 kb sectors to a computer system that uses 8 kb sectors. In this specific example, virtual disk parser 404 can determine that the sector size has increased by, for example, querying device information for the new storage device and determine to expand the sector size used by log 420. Virtual disk parser can scan virtual disk file 406 for an unused section and determine to use it for a new log. Virtual disk parser 404 can create expanded log 910 in the unused section of virtual disk file 406 and begin expanding log entries 902 and 904. Virtual disk parser 404 can scan log entry 1002 and determine that it is located at file offset 16 kb, for example. Virtual disk parser 404 can determine that 16 kb represents the first part of an 8 kb aligned sector (for example virtual disk parser 404 can divide 16 kb by 8 kb and determine that the answer is an integer, i.e., 2). Virtual disk parser 404 can then create an expanded log entry 1006 and copy the payload for log entry 1002 (A') into log entry 1006. Since log entries in expanded log 1010 are 8 kb, a second portion of needs to be added to log entry 1006 so that when expanded log 1010 is replayed the data written to a copy of persisted virtual disk file in memory will be correct. In order to take this concern into account, virtual disk parser 404 can be configured to scan log entries in expanded log 1010 for a payload that updates file offset 20 kb and determine that none exist. In response to this determination, virtual disk parser 404 can read file offset 20 kb in persisted virtual disk file 1000 and copy it into log entry 1006.

After log entry 1006 is created, virtual disk parser 404 can read log entry 1004 and determine that it includes an update to virtual file offset 20 kb. Virtual disk parser 404 can determine that 20 kb represents the second part of an 8 kb aligned sector; create expanded log entry 1008; and copy the payload for log entry 1004 (B') into log entry 1008 into the second 4 kb sized part of log entry 1008. Virtual disk parser 404 can be configured to scan log entries in expanded log 1010 for a payload that updates file offset 20 kb and determine that log entry 1006 modified offset 16 kb. In response to this determination, virtual disk parser 404 can copy A' into the first part of log entry 1008. Consequently, when these two log entries are applied by virtual disk parser 404, virtual disk file will include A' and B' at virtual disk offset 16 kb. After each log entry is expanded and applied to disk, virtual disk 402 can be used by virtual machine 410.

Figure 11:
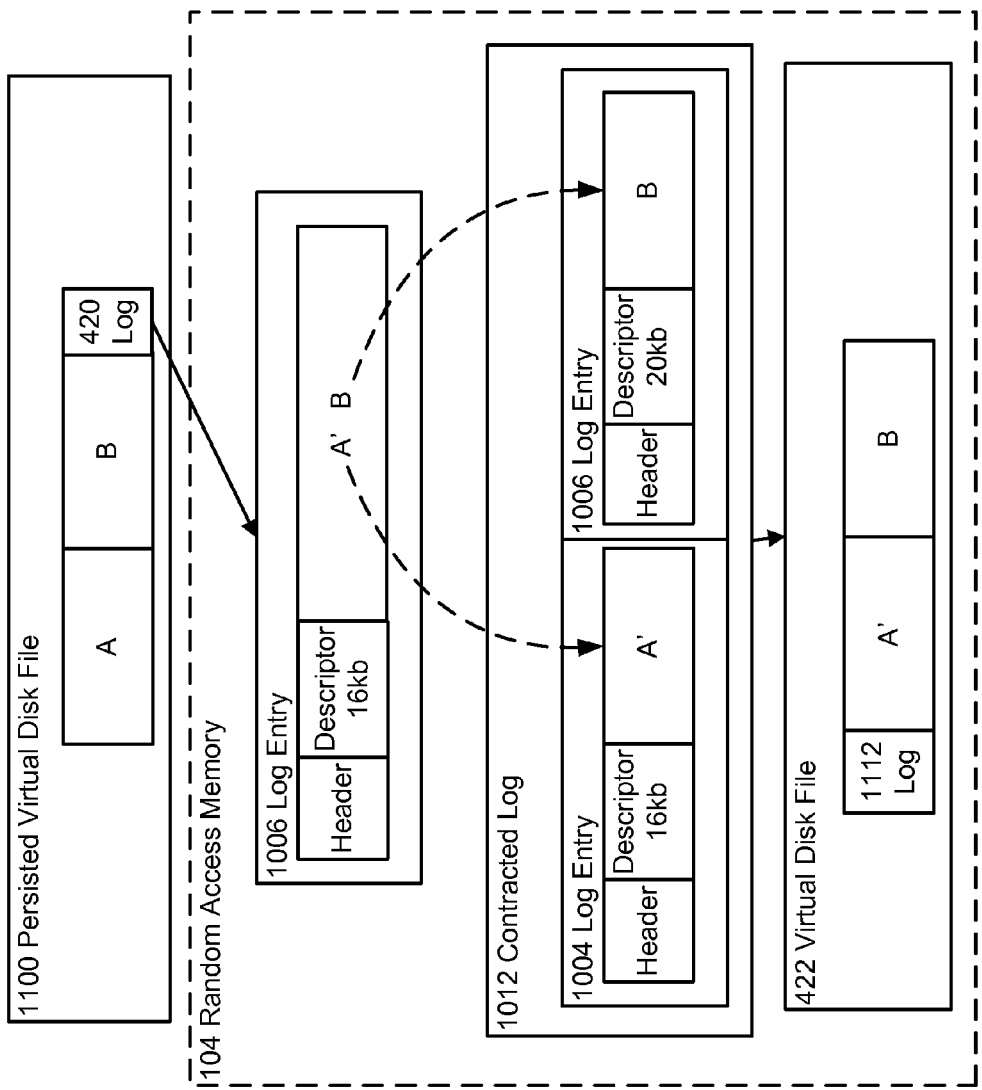
FIG. 11 depicts a specific example of how a contracted log can be generated.

Turning to FIG. 11, it illustrates a technique for contracting a log entry. The underlying rationale for contracting log entries is the same as discussed above with respect to FIG. 10 and similar operations can be used to contract the log. In FIG. 11 suppose that virtual machine 410 is migrated from a computer system that includes a storage device that uses 8 kb sectors (or any other power of two sized sectors) to a computer system that uses 4 kb sectors. Virtual disk parser 404 can open persisted virtual disk file 1100 and determine that the sector size has changed by comparing information in a header of one of the log entries to information provided by the new storage device. In response to the comparison, virtual disk parser 404 can be configured to contract the sector size used by log 420. Virtual disk parser 404 can scan virtual disk file 406 for an unused section and determine to use it for a new log. Virtual disk parser 404 can create contracted log 1110 in the unused section of virtual disk file 406 and begin scanning logs. Virtual disk parser 404 can scan log entry 1102 and determine that it is located at file offset 16 kb and that the first part represents a change to file offset 16 kb and implicitly the second part represents a change to file offset 20 kb. Virtual disk parser 404 can then create contracted log entries 1104 and 1106 and copy the first part of log entry 1102 to log entry 1104 and the second part of log entry 1102 to log entry 1106. Consequently, when these two log entries are applied by virtual disk parser 404 virtual disk file 406 will include A' and B at virtual disk file offset 16 kb and virtual disk file 20 kb respectively. After each log entry is contracted and applied to a copy of virtual disk file in RAM (virtual disk file 406), virtual disk 402 can be used by virtual machine 410.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 12:
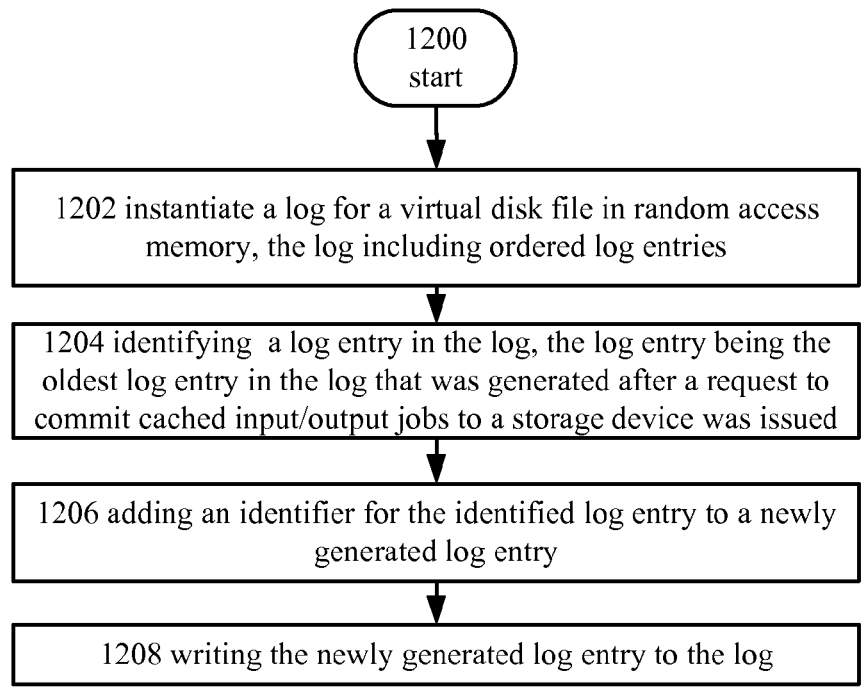
FIG. 12 depicts an operational procedure that can be embodied within a computer-readable storage medium and/or executed by a computer system.

Turning now to FIG. 12, it illustrates an operational procedure including operations 1200, 1202, 1204, 1206, and 1208. Operation 1200 begins the operational procedure and operation 1202 shows that a computer system can include circuitry configured to instantiate a log for a virtual disk file in random access memory, the log including ordered log entries. For example, and referring briefly to FIG. 4, computer system 400 can include virtual disk parser 404, which can instantiate log 420 in random access memory from virtual disk file 406. Turning to FIG. 6, virtual disk parser 404 can open virtual disk file 406 into random access memory and detect log 420 stored therein. Virtual disk parser 404 can then copy log 420 into random access memory 104. As shown by FIG. 6, the log entries stored in log 420 can be ordered, e.g., each entry can include a sequence number or some other identifier such as a timestamp that indicates an order in which the log entries were written.

Continuing with the description of FIG. 12, operation 1204 shows that the computer system can include circuitry configured to identify a log entry in the log, the log entry being the oldest log entry in the log that was generated after a request to commit cached input/output jobs to a storage device was issued. Virtual disk parser 404 can execute on processor 102 and read a pointer that indicates the position of the tail. In this example, the tail can point to the virtual disk file offset indicative of the beginning of a log entry that has not been flushed to storage disk 106. Put another way, the tail can point to the oldest log entry that is unflushed. Turning to FIG. 8, suppose that log 420 is in a state similar to log 420-B. In this example, virtual disk parser 404 can determine that the tail is at the beginning of log 420-A, e.g., virtual disk file offset 0 or the first offset for log entry 1.

Turning back to FIG. 12, operation 1206 shows that the computer system can include circuitry for adding an identifier for the identified log entry to a newly generated log entry. For example, virtual disk parser 404 can add an identifier, e.g., the virtual disk file offset indicative of the first byte in log 420 used to store log entry 1, the sequence number of the identified log entry, etc., to a newly generated log entry. In a specific example, and turning to FIG. 8, suppose log 420 is in the state illustrated by log 420-A, in this example virtual disk parser 404 can generate log entry 2 and add an identifier for log entry 1 to the header of log entry 2.

Continuing with the description of FIG. 12, operation 1208 shows that computer system 400 can include circuitry for writing the newly generated log entry to the log. Virtual disk parser 404 can write the newly generated log entry to log 420.

In response to writing the log entry, one or more input/output jobs can be issued to storage device 106 that describe the log entry. The one or more IO jobs can be processed and stored in various caches of storage device 106 until they are eventually committed to persistent storage unit 460, e.g., a disc platter, one or more cells of Flash memory, etc. When the newly generated log entry is committed by storage device 106 acts as both a checkpoint record (indicating that event logs before the tail have been committed to storage device 106 and applied to virtual disk file 406) and as a log entry.

Figure 13:
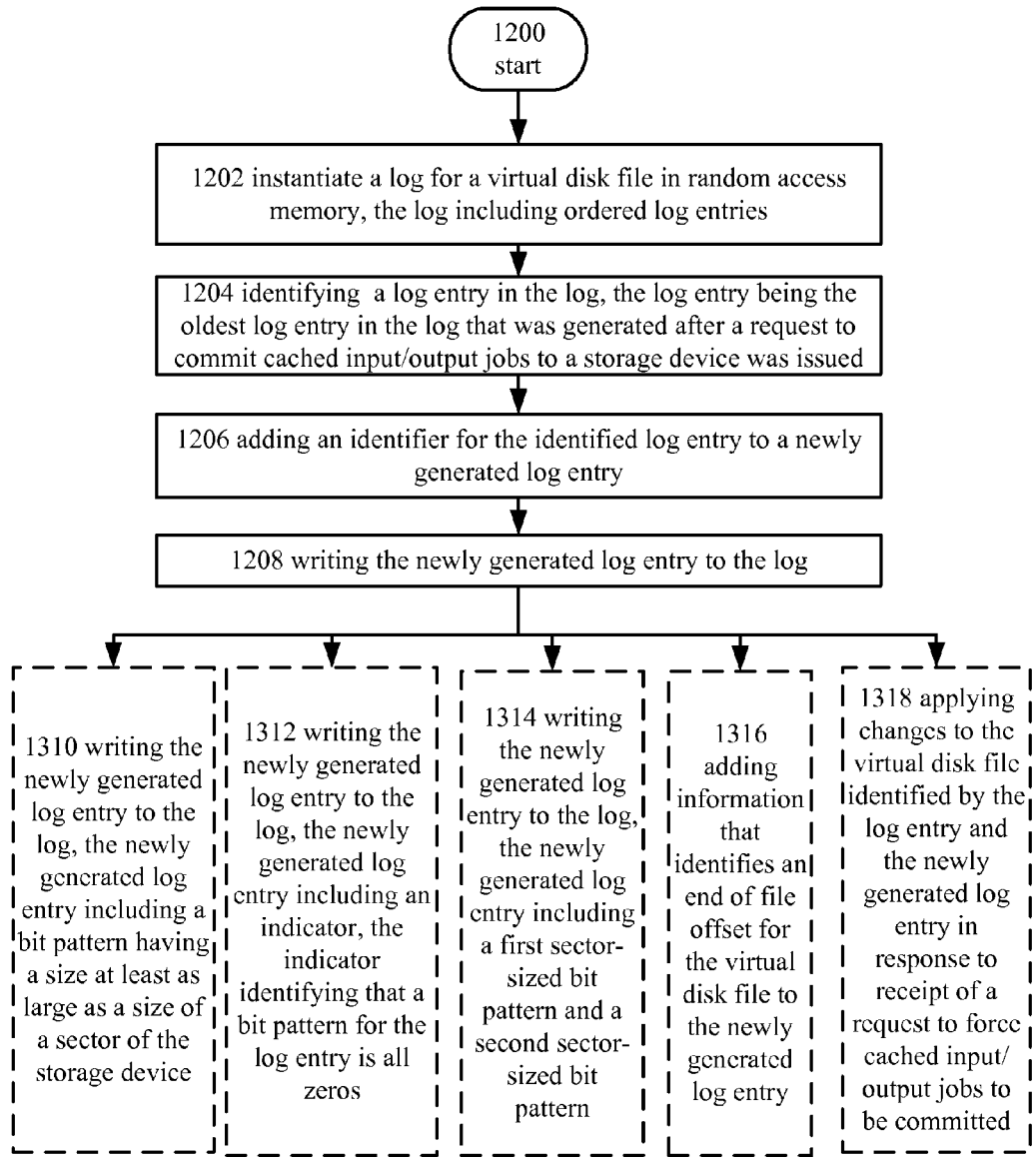
FIG. 13 depicts additional operations that can be executed in conjunction with those illustrated by FIG. 12.

Turning now to FIG. 13, it illustrates additional operations that can be executed in conjunction with those illustrated by FIG. 12. Operation 1310 illustrates that in an embodiment the computer system can include circuitry for writing the newly generated log entry to the log, the newly generated log entry including a bit pattern having a size at least as large as a size of a sector of the storage device. For example, and turning to FIG. 7, in this example the log entry can include a payload, e.g., a bit pattern, that is the same size as a sector of persistent storage unit 460. In a specific example, the log entry could be similar to log entry 702, 704, or 706. In the instance that this log entry is replayed, virtual disk parser 404 can write the contents of the payload to the virtual disk file offset in virtual disk file 406 identified by log 420.

Continuing with the description of FIG. 13, operation 1312 indicates that the computer system can also include circuitry for writing the newly generated log entry to the log, the newly generated log entry including an indicator, the indicator identifying that a bit pattern for the log entry is all zeros. For example, virtual disk parser 404 can determine to generate a log entry that includes a payload of all zeros. In this example, rather than creating such a log entry, virtual disk parser 404 can generate a log entry that includes an identifier in the descriptor that indicates that the payload is all zeros. This type of log entry can be used to reduce the amount of space that the log entry takes in log 420. In a specific example, the log entry may be similar to log entry 708 of FIG. 7.

As shown by operation 1314, the computer system can additionally include circuitry for writing the newly generated log entry to the log, the newly generated log entry including a first sector-sized bit pattern and a second sector-sized bit pattern. For example, virtual disk parser 404 can receive a request to make two changes to virtual disk file metadata, e.g., two changes to allocation table 416, that are dependent upon each other. Virtual disk parser 404 can be configured to determine that the changes are dependent upon each other when multiple sectors need to be changed in order to capture a single modification to virtual disk file metadata or when discrete changes are transactionally dependent upon each other and generate a single log entry that includes two or more payloads. In a specific example, the log entry generated by virtual disk parser 404 may be similar to log entry 704 of FIG. 7.

Continuing with the description of FIG. 13, operation 1316 shows that the computer system can include circuitry configured to add information that identifies an end of file offset for the virtual disk file to the newly generated log entry. For example, virtual disk parser 404 can add information that identifies the end of file for virtual disk file 406 to the newly generated log entry prior to writing it to log 420. For example, virtual disk file 406 can be extended based on how virtual disk 402 is used by virtual machine 410. Similar to other writes to virtual disk file 406, writes that extend the EOF (end of file) are not guaranteed to have been persisted until a flush is completed by storage device 106. Thus, virtual disk parser 404 can be configured to add information that identifies the EOF when a log entry is created in order to correct the EOF in the instance that the EOF of virtual disk file 406 is different than the EOF in a log entry virtual disk file 406.

Turning to operation 1318, it shows that the computer system can also include circuitry configured to apply changes to the virtual disk file identified by the log entry and the newly generated log entry in response to receipt of a request to force cached input/output jobs to be committed. For example, sometime after log entries are written to log 420 a flush command can be issued. Once a flush is issued to storage device 106, virtual disk parser 404 can apply changes in the payload section of log entries that were logged since the last flush to virtual disk file 406 thereby causing IO jobs indicative of the changes to be issued to storage device 106. In a specific example, and turning to log 420-D and 420-E of FIG. 7, suppose a flush command was issued when the tail pointer was pointing to the first sector indicative of log entry 3. In response to issuance of a flush, virtual disk parser 404 can identify log entries that were logged since the last flush, i.e., log entry 3 since the tail pointer indicates that a flush was completed after log entry 2, and apply the payload of log entry 3 to virtual disk file 406. In a specific example, the payload could be an update to allocation table 416. After the payload of log entry 3 was applied to virtual disk file 406, virtual disk parser 404 can update the tail pointer to point to where log entry 4 will be written as shown by log 420-E. Virtual disk parser 404 could then issue another flush; however, since flushing the log entry is equivalent to flushing the change described by the log entry to virtual disk file 406 virtual disk parser 404 is not required to issue another flush.

In a specific example, virtual disk parser 404 may issue the flush command. For example, virtual disk parser 404 may include a timer set to a predetermined time period. When the timer expires virtual disk parser 404 can be configured to issue a flush command. One of skill in the art can appreciate that the predetermined time interval can be set based on the type of hardware in computer system and to take into account the cost (in terms of time) that it takes to complete a flush. In addition, or in the alternative, virtual disk parser 404 can be configured to issue a flush command to storage device 106 in response to memory pressure within log 420. For example, the size of log 420 may be limited and virtual disk parser 404 may be configured to issue a flush command in the instance that a predetermined amount of space is allocated within log 420 to storing log files. Similarly, the predetermined amount of space can be set based on the type of hardware in computer system, the size of log 420, the amount of time it takes to complete a flush, etc. Turning briefly to FIG. 7, a log entry similar to log entry 710 can be used to initiate a flush operation in the instance that the memory pressure within log 420 exceeds the threshold.

A flush can also be issued by virtual machine 410 or client computer system 506. For example, suppose application 424 is a word processing program set to auto save every ten minutes. When a timer expires the word processing program can issue a flush to guest operating system 412 in order to save the contents of the file. In response to receipt of the flush request, guest operating system 412 can instruct file system 414 to flush and virtual disk parser 404 can eventually receive a request to flush. Virtual disk parser 404 can in turn issue a flush to virtualization system file system 408. Thus, changes to virtual disk file metadata can piggy-back off flush operations initiated by virtual machine 410 or computer system 506. Virtual disk parser 404 can receive an acknowledgment signal indicating that storage device 106 completed the flush and report completion of the flush to file system 414.

Figure 14:
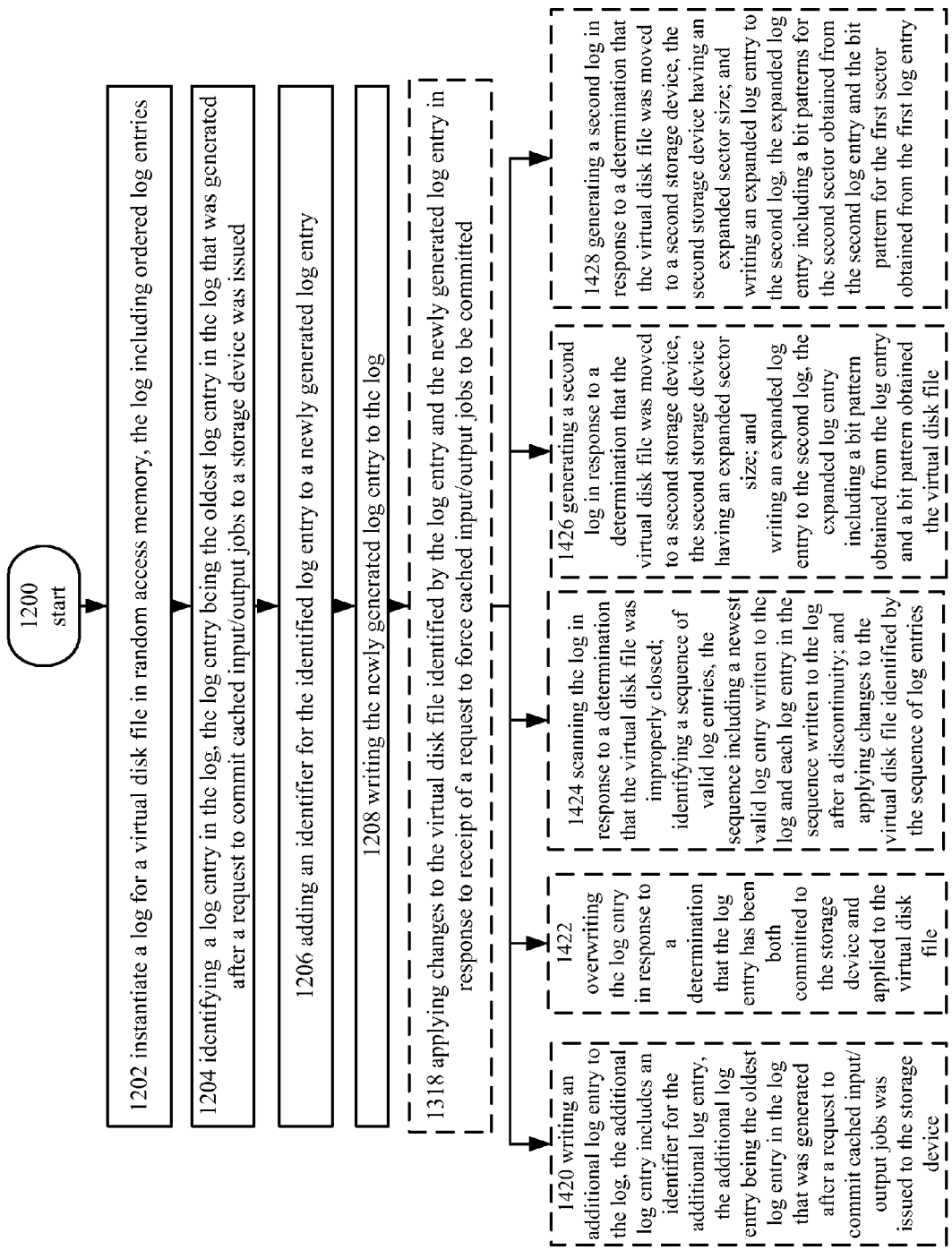
FIG. 14 depicts additional operations that can be executed in conjunction with those illustrated by FIG. 13.

Referring now to FIG. 14, it illustrates additional operations that can be executed in conjunction with operation 1318 of FIG. 13. As shown by operation 1420, the computer system can also include circuitry for writing an additional log entry to the log, the additional log entry includes an identifier for the additional log entry, the additional log entry being the oldest log entry in the log that was generated after a request to commit cached input/output jobs was issued to the storage device. For example, sometime after a flush another change to metadata of virtual disk file 406 can be made by virtual disk parser 404. In this example, virtual disk parser 404 can generate another log entry including a payload indicative of the change and check the memory pointer for the tail to determine which identifier to write to the additional log entry. Since the log entry and the newly generated log have been flushed virtual disk parser 404 can add an identifier for the additional log entry to the additional log entry and write it to log 420. Returning to FIG. 8 and in particular to log 420-E, suppose that virtual disk parser 404 generates log entry 4 and determines that log entries 1-3 have been committed and applied. In response to this determination, virtual disk parser 404 can add the virtual disk file offset indicative of the starting location of log entry 4 to the header of log entry 4 and write log entry 4 to log 420.

Turning back to FIG. 14, operation 1422 it indicates that in an embodiment the computer system can include circuitry for overwriting the log entry in response to a determination that the log entry has been both committed to the storage device and applied to the virtual disk file. For example, virtual disk parser 404 can be configured to overwrite log entries that have been flushed. In an embodiment, the placement of the tail pointer can be used to differentiate the flushed log entries from those that are not. Virtual disk parser 404 can be configured to overwrite log entries that have virtual disk file offset values that are less than the virtual disk file offset value indicative of the tail pointer. Turning briefly to FIG. 8, and in particular log 420-F and 420-G, virtual disk parser 404 can generate log entry 5 and determine that the end of log 420 is reached. Virtual disk parser 404 can then determine the address for the tail and determine that log entries 1-3 have been flushed because of the location of the tail pointer. Virtual disk parser 404 can then write log entry 5 to log 420 as shown by log 420-G.

Continuing with the description of FIG. 14, operation 1424 shows that the computer system can include circuitry for scanning the log in response to a determination that the virtual disk file was improperly closed; circuitry for identifying a sequence of valid log entries, the sequence including a newest valid log entry written to the log and each log entry in the sequence written to the log after a discontinuity; and circuitry for applying changes to the virtual disk file identified by the sequence of log entries. For example, a power failure may occur sometime during the operation of computer system 400. Computer system 400 may be restarted and virtualization system 420 may be executed. Virtual disk parser 404 can start running and a request to start virtual machine 410 may be received. Virtual disk parser 404 can open virtual disk file 406 stored on storage device 106 and open log 420. Virtual disk parser 404 can read the log entries stored in persisted log 420 and determine whether there is a sequence of valid entries stored therein. Virtual disk parser 404 can then select a sequence of valid entries, i.e., each entry in the sequence is valid, the sequence includes the most recent entry, and each log entry in the sequence was written after the most recent discontinuity point. Once the sequence is identified, virtual disk parser 404 can extract the payload or payloads from log entries in the sequence and apply them to the virtual disk file 406 causing IO job or jobs to be issued to storage disk 106 to change the on-disk copy of virtual disk file 406.

In a specific example, and referring to FIG. 9, suppose log 420 looks similar to persisted log 902 after reboot. In this example, virtual disk parser 404 may identify a sequence of valid entries (log entries 5-7) that includes the latest valid entry (log entry 7) and each log entry in the sequence was written after the most recent discontinuity (log entry 4). In this specific example, virtual disk parser 404 can be configured to select log entries 5-7 and extract the payload and the virtual disk file offset from each log entry. Virtual disk parser 404 can then sequentially apply each payload to virtual disk file 406.

Continuing with the description of FIG. 14, operation 1426, indicates that the computer system can include circuitry for generating a second log in response to a determination that the virtual disk file was moved to a second storage device, the second storage device having an expanded sector size; and circuitry for writing an expanded log entry to the second log, the expanded log entry including a bit pattern obtained from the log entry and a bit pattern obtained the virtual disk file. For example, suppose that virtual disk file 406 is copied from computer system 400 to a different computer system having a similar configuration and the sector size of its storage device is larger. For example, suppose that the sector size of storage device 106 is 4 kb and the sector size of the larger storage device is 8 kb. In this example, virtual disk parser 404 can open virtual disk file 406 into memory and read log 420. Virtual disk parser 404 can determine that the sector size for the larger storage device is larger than the payload in the log entries and determine to expand the size of the log entries. In a specific example, virtual disk parser 404 can identify a sequence of events to apply to virtual disk file 406 and then generate a new expanded log including expanded logs that reflect the selected sequence. In a specific example, the expanded log can be similar to expanded log 1010 shown by FIG. 10 and the expanded log entry can be similar to log entry 1006. After the expanded log is generated, virtual disk parser 404 can be configured to generate a log entry that includes the payload from a log entry and data from virtual disk file 406.

Continuing with the description of FIG. 14, operation 1428, indicates that the computer system can include circuitry for generating a second log in response to a determination that the virtual disk file was moved to a second storage device, the second storage device having an expanded sector size; and circuitry for writing an expanded log entry to the second log, the expanded log entry including a bit patterns for the second sector obtained from the second log entry and the bit pattern for the first sector obtained from the first log entry. For example, suppose that virtual disk file 406 is copied from computer system 400 to a different computer system having a similar configuration and the sector size of its storage device is larger. For example, suppose that the sector size of storage device 106 is 4 kb and the sector size of the larger storage device is 8 kb. In this example, virtual disk parser 404 can open virtual disk file 406 into memory and read log 420. Virtual disk parser 404 can determine that the sector size for the larger storage device is larger than the payload in the log entries and determine to expand the size of the log entries. Virtual disk parser 404 can then create an expanded log entry that includes data from multiple log entries obtained from log 420. In a specific example, the expanded log can be similar to expanded log 1010 shown by FIG. 10 and the expanded log entry can be similar to log entry 1008.

Figure 15:
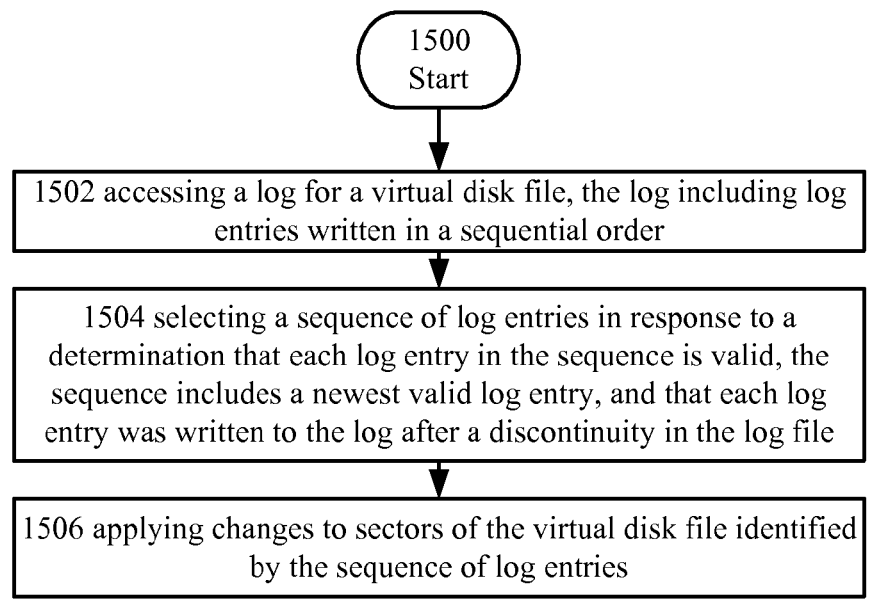
FIG. 15 depicts an operational procedure that can be embodied within a computer-readable storage medium and/or executed by a computer system.

Turning now to FIG. 15, it illustrates an operational procedure including operations 1500, 1502, 1504, 1506, and 1508. Operation 1500 begins the procedure and operation 1502 illustrates that a computer system can include circuitry configured to access a log for a virtual disk file, the log including log entries written in a sequential order. For example, virtual disk parser 404 can open virtual disk file 406 into random access memory 104. Virtual disk parser 404 can read virtual disk file 406 and detect log 420 stored therein. In a specific example, log 420 could be similar to log 902 or 906 of FIG. 9.

Continuing with the description of FIG. 15, operation 1504 shows that the computer system can include circuitry for selecting a sequence of log entries in response to a determination that each log entry in the sequence is valid, the sequence includes a newest valid log entry, and that each log entry was written to the log after a discontinuity in the log file. For example, virtual disk parser 404 can scan each log entry in log 420 and generate a table of information that identifies the sequence that each valid log entry belongs to. For example, and assuming log 420 is similar to log 906, virtual disk parser 404 can create a table similar to table 908. After table 908 is populated and scanned a second time, virtual disk parser 404 can select a sequence of valid entries that includes the newest valid log entry and each log entry was written to the log after a discontinuity. In this specific example, virtual disk parser 404 can select the sequence 9-14 because it includes the most recent valid log entry (log entry 14) and each entry was written after the most recent discontinuity (the discontinuity located where log entry 8 should be).

Turning now to operation 1506, it demonstrates that computer system 400 can also include circuitry for applying changes to sectors of the virtual disk file identified by the sequence of log entries. Returning to FIG. 9, in the instance where log 420 is similar to log 908, virtual disk parser 404 can determine to replay log events 9-14. Virtual disk parser 404 can extract the payloads and virtual disk file offset values and write the payloads to virtual disk 406. Writing the payloads results in IO jobs being issued to storage device 106 to commit them to disk.

Figure 16:
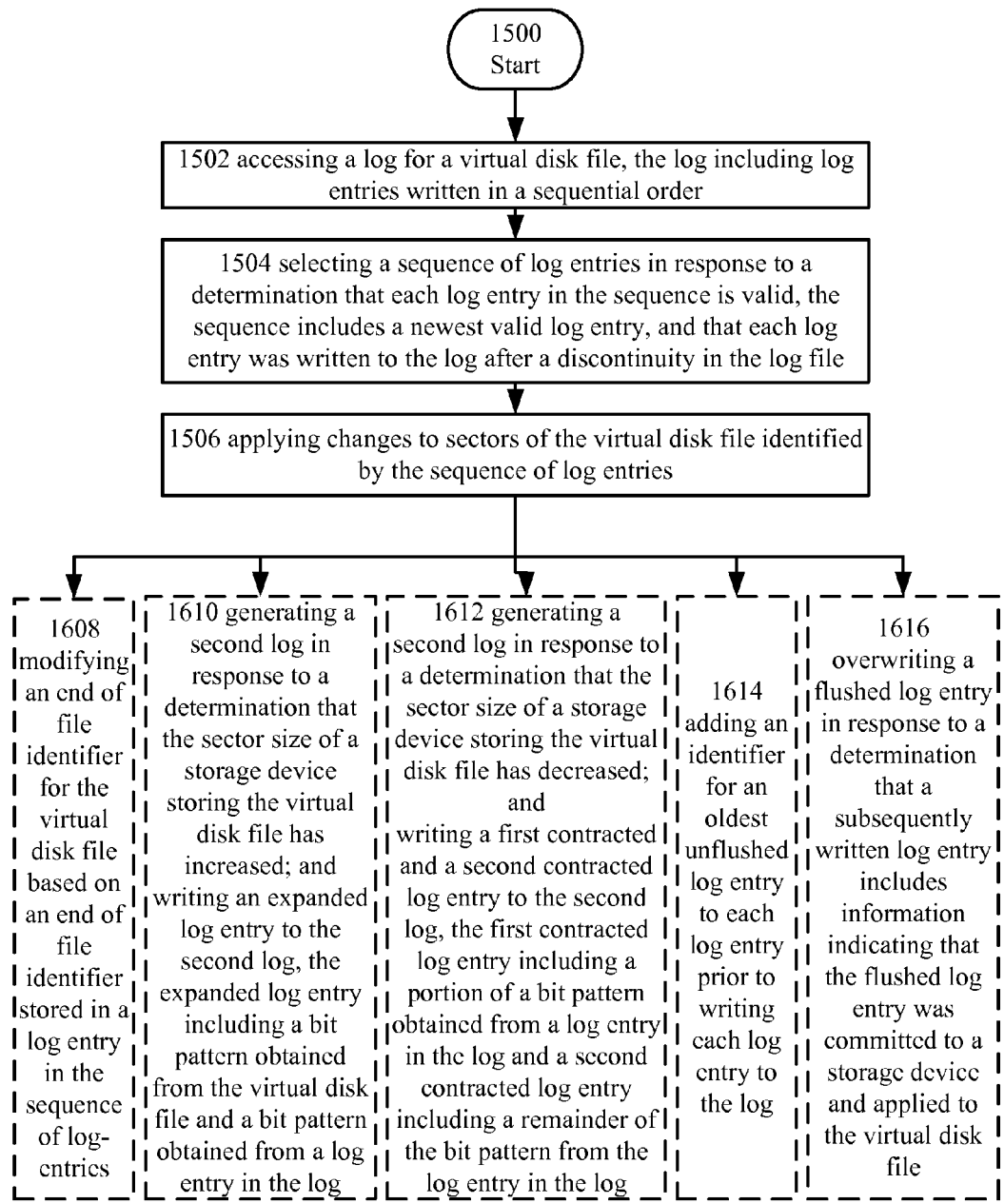
FIG. 16 depicts additional operations that can be executed in conjunction with those illustrated by FIG. 15.

Turning now to FIG. 16, it illustrates alternative operations that can be executed by a computer system. Turning now to operation 1608, it shows that the computer system can be configured to include circuitry for modifying an end of file identifier for the virtual disk file based on an end of file identifier stored in a log entry in the sequence of log-entries. For example, virtual disk parser 404 can change the EOF of virtual disk file 406 in response to detecting a log entry or log entries in the selected sequence that indicates that the EOF of virtual disk file 406 is different than what was logged. For example, if the information indicates that the EOF has been extended then virtual disk parser 404 can extend virtual disk file 406 to match what was in the log entries.

Turning to operation 1610, it shows that in an embodiment the computer system can include circuitry for generating a second log in response to a determination that the sector size of a storage device storing the virtual disk file has increased; and circuitry for writing an expanded log entry to the second log, the expanded log entry including a bit pattern obtained from the virtual disk file and a bit pattern obtained from a log entry in the log. For example, virtual disk parser 404 can open virtual disk file 406 and scan log 420. Virtual disk parser 404 can determine the sector size of the storage device that log 420 was created on and compare it to a sector size of a storage device currently storing virtual disk file 406. In this example, suppose log 420 was generated on a different computer system and the sector size of storage device 106 is larger than the sector size used by the different computer system. For example, suppose that the sector size of storage device 106 is 8 kb and the sector size of a storage device that previously stored virtual disk file 406 was 4 kb. In response to this determination, virtual disk parser 404 can expand the size of the log entries by generating a new expanded log.

In an exemplary configuration, virtual disk parser 404 can determine a sequence of log entries in log 420 to replay and create an expanded entry for each log entry in the sequence. Virtual disk parser 404 can generate an expanded log entry having a payload equal to a multiple of the sector size used by storage device 106 (equal to a multiple of 8 kb in a specific example) for each log entry in the sequence. Then, for each log entry in the sequence virtual disk parser 404 can use the sector size used by storage device 106 and a descriptor from an old log entry to determine where to insert the payload into a new log entry such that the new log entry is aligned with the sector size of storage device 106. For the first new log entry, virtual disk parser 404 can use data from virtual disk file 406 to fill the remainder of the payload and for each subsequent entry virtual disk parser 404 can use a combination of on-disk data and data from earlier log entries within the sequence.

Continuing with the description of FIG. 16, operation 1612 shows that the computer system can include circuitry for generating a second log in response to a determination that the sector size of a storage device storing the virtual disk file has decreased; and circuitry for writing a first contracted and a second contracted log entry to the second log, the first contracted log entry including a portion of a bit pattern obtained from a log entry in the log and a second contracted log entry including a remainder of the bit pattern from the log entry in the log. For example, virtual disk parser 404 can be configured to determine that the sector size used by the underlying storage device is smaller than the sector size indicated in log 420. In an optional configuration, virtual disk parser 404 can create a new contracted log within virtual disk file 406 and convert a sequence of log entries selected to be replayed to contracted log entries by using the sector size of storage device 106 to split each log entry into multiple log entries. Once the contracted log entries are generated, virtual disk parser 404 can replay them by applying the payload to virtual disk file 406. The act of writing the payloads associated with the contracted log entries causes one or more IO jobs to be issued to storage device 106. Storage device 106 can store the IO jobs in cache 454 and then eventually commit them to an on-disk copy of virtual disk file 406. While log 420 can be contracted, it does not have to be contracted. It is safe to replay a log that was created for a larger sector size on a device with a smaller sector size.

Continuing with the description of FIG. 16, operation 1614 shows that the computer system can additionally include circuitry for adding an identifier for an oldest unflushed log entry to each log entry prior to writing each log entry to the log. For example, when virtual disk parser 404 determines to update metadata of virtual disk file 406 such as an update to allocation table 416, virtual disk parser 404 can check a memory pointer that identifies the oldest unflushed log entry in log 420. In this example, virtual disk parser 404 can be configured to add an identifier, e.g., the virtual disk file offset indicative of the first sector used to store the identified log entry, the sequence number of the identified log entry, etc., of the oldest unflushed log entry to each log entry that is generated.

Continuing with the description of FIG. 16, operation 1616 shows that computer system 400 can additionally include circuitry for overwriting a flushed log entry in response to a determination that a subsequently written log entry includes information indicating that the flushed log entry was committed to a storage device and applied to the virtual disk file. For example, virtual disk parser 404 can be configured to overwrite log entries that have been flushed in the instance that another log entry includes information indicating that the flushed log entry was in fact flushed. In an exemplary embodiment, the information can be the presence of an identifier for a more recent log entry. The presence of an identifier for a more recent log entry within another log entry is indicative of the fact that log entries prior to the more recent log entry were flushed to disk. For example, and turning to log 420-F of FIG. 8. The presence of the identifier for log entry 4 within log entry 4 indicates that log entries 1-3 have been flushed and have been applied to virtual disk file 406.

Figure 17:
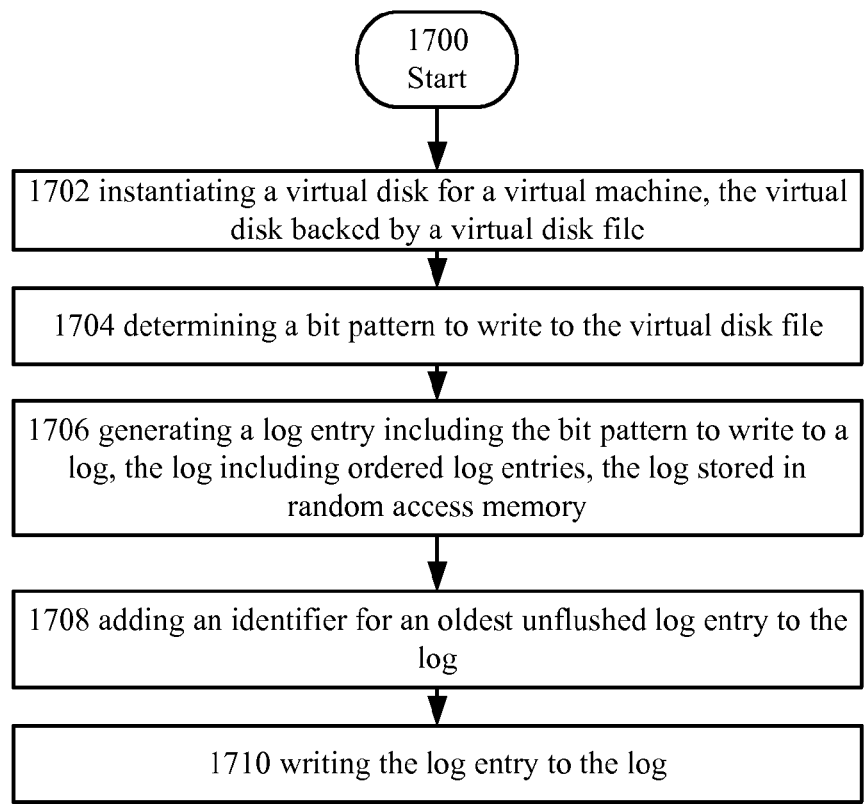
FIG. 17 depicts an operational procedure that can be embodied within a computer-readable storage medium and/or executed by a computer system.

Turning to FIG. 17, it shows an operational procedure that computer system 400 can be configured to execute including operations 1700, 1702, 1704, and 1706. Turning to operation 1700, it begins the operational procedure and operation 1702 shows that the computer system can include circuitry for instantiating a virtual disk for a virtual machine, the virtual disk backed by a virtual disk file. For example, and referring briefly to FIG. 4, computer system 400 can include virtual disk parser 404, which can instantiate virtual disk 402 within virtual machine 410. Turning to FIG. 5, this figure illustrates that virtual disk 402 can be backed by virtual disk file 406. Or put another way, virtual disk file 406 can store the underlying data for virtual disk 402.

Continuing with the description of FIG. 17, operation 1704 shows that the computer system can additionally include, but is not limited to circuitry for determining a bit pattern to write to the virtual disk file. Virtual disk parser 404 can determine to modify metadata of virtual disk file 406 in response to receipt of an IO job from virtual machine 410 or some other signal. In a specific example, suppose a block of virtual disk 402 is written to by virtual machine 410 and that this block is not described by any part of virtual disk file 406. Virtual disk parser 404 may select a section of virtual disk file to use to describe the virtual disk block; update an in-memory copy of allocation table 416 and generate a bit pattern indicative of information that links the virtual disk block to the section of virtual disk file to write to the on-disk copy of allocation table 416, which is stored in virtual disk file 406.

Continuing with the description of FIG. 17, operation 1706 indicates that the computer system can include circuitry for generating a log entry including the bit pattern to write to a log, the log including ordered log entries, the log stored in random access memory. For example, virtual disk parser 404 can be configured to generate a log entry and write the bit pattern to a payload section of the log entry. Turning to FIG. 7, in a specific example embodiment virtual disk parser 404 can generate a log entry that has a format similar to log entry 702, 704, or 706. In this example, the log entry can include a header, that identifies that that the data is a log entry, a sequence number, a timestamp, a session number (identifying the session that the entry is for), etc., a descriptor identifying the location in virtual disk file 406 to write the bit pattern, and a payload section including the bit pattern or a portion thereof.

Turning back to FIG. 17, operation 1708 identifies that the computer system can additionally include, but is not limited to circuitry for adding an identifier for an oldest unflushed log entry to the log. For example, virtual disk parser 404 can check a memory pointer that identifies the oldest unflushed log entry in log 420 and store information that can be used to identify this unflushed entry within the log entry. In this example, virtual disk parser 404 can be configured to add an identifier, e.g., the virtual disk file offset indicative of the first sector used to store the identified log entry, the sequence number of the identified log entry, etc., of the oldest unflushed log entry to each log entry that is generated. In a specific example, and turning to FIG. 8, suppose log 420 is in the state illustrated by log 420-A, in this example virtual disk parser 404 can generate log entry 2 and add the address of the tail to its header, i.e., an identifier that identifies that log entry 1 is the oldest unflushed entry.

Now turning to operation 1710, it shows that the computer system can additionally include circuitry for writing the log entry to the log. Virtual disk parser 404 can write the log entry to log 420. One or more input/output jobs can be issued to storage device 106 indicative of the log entry and these one or more IO jobs can be stored in cache 454 until they are eventually committed to persistent storage unit 460, e.g., a disc platter, FLASH RAM, etc.

Figure 18:
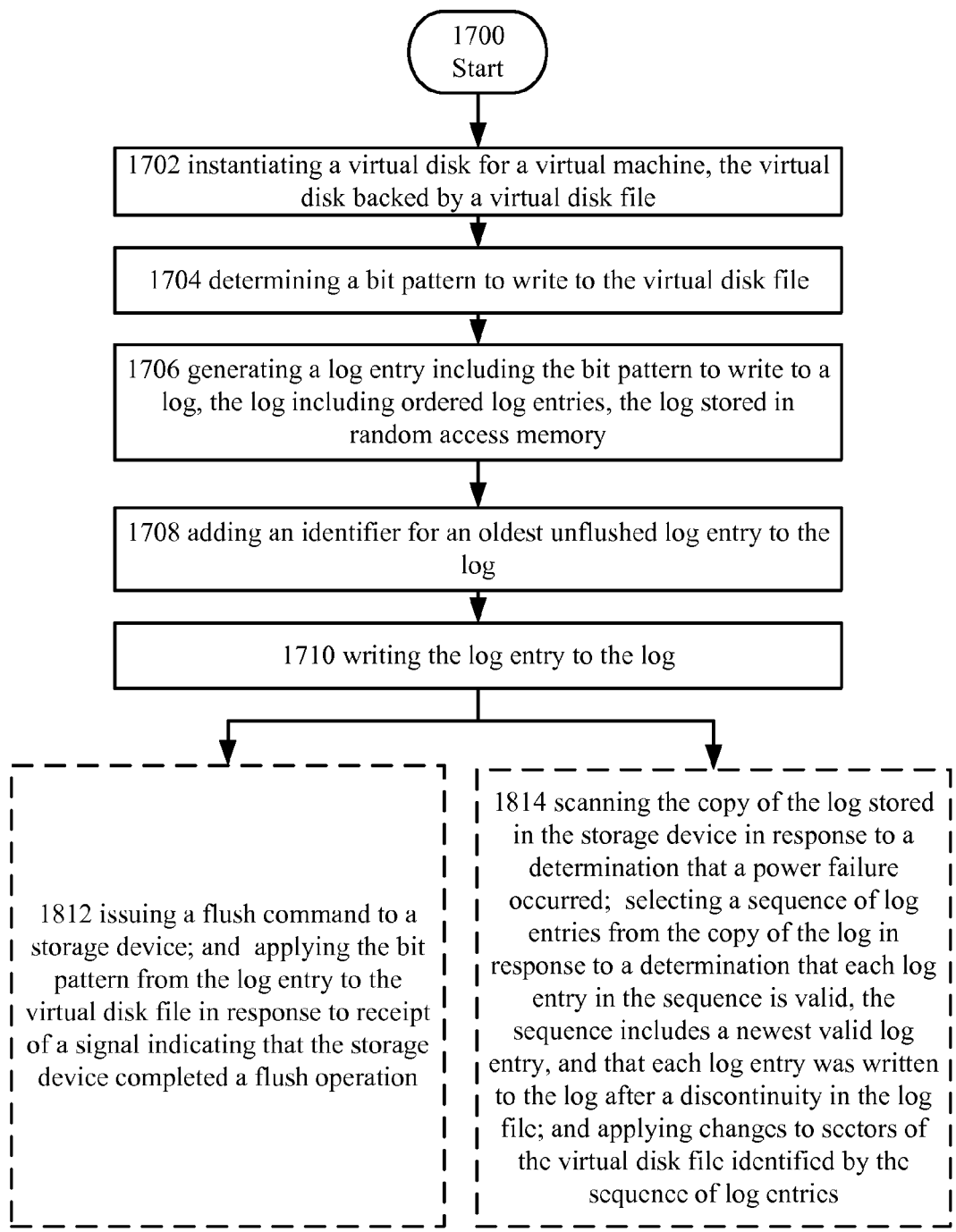
FIG. 18 depicts additional operations that can be executed in conjunction with those illustrated by FIG. 17.

Referring now to FIG. 18, it shows additional operations that can be executed in conjunction with those illustrated by FIG. 17. Operation 1812 demonstrates that the computer system can be configured to include, but is not limited to circuitry for issuing a flush command to a storage device; and circuitry for applying the bit pattern from the log entry to the virtual disk file in response to receipt of a signal indicating that the storage device completed a flush operation. For example, sometime after log entries are written to log 420 virtual disk parser 404 can issue a flush command to storage device 106 thereby causing storage device 106 to write pending IO jobs to persistent storage unit 460 and report back completion of the operation. When virtual disk parser 404 receives the acknowledgment indicating that the flush operation finished, virtual disk parser 404 can apply changes in the payload section of the log entry that was just flushed to virtual disk file 406. This results in IO jobs indicative of the change to virtual disk file 406 being issued to storage device 106. Virtual disk parser 404 can optionally issue another flush to cause these IO jobs to ensure that these IO jobs are committed to persistent storage unit 460; however, since they are described by the persistent log, a flush operation is not necessary.

Continuing with the description of FIG. 18, operation 1814 demonstrates that in an example embodiment where the computer system includes circuitry for executing operation 1812 it can additionally include circuitry for scanning the copy of the log stored in the storage device in response to a determination that a power failure occurred; circuitry for selecting a sequence of log entries from the copy of the log in response to a determination that each log entry in the sequence is valid, the sequence includes a newest valid log entry, and that each log entry was written to the log after a discontinuity in the log file; and circuitry for applying changes to sectors of the virtual disk file identified by the sequence of log entries. For example, a power failure may occur sometime during the operation of computer system 400, but after the log entry was flushed. Computer system 400 may be restarted and virtualization system 420 may be executed. Virtual disk parser 404 can start running and a request to start virtual machine 410 may be received. Virtual disk parser 404 can open the persisted copy of virtual disk file 406 stored on storage device 106 and read log 420. Virtual disk parser 404 can read the log entries and select a sequence of valid entries to replay. Virtual disk parser 404 can select a sequence that includes one or more valid log entries, where the sequence includes the newest log entry and the sequence does not include a discontinuity point. Once the sequence is identified, virtual disk parser 404 can extract the payload or payloads from the sequence and apply them to the virtual disk file 406.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A computer-readable storage medium including instructions that upon execution by a processor cause the processor to:
   instantiate a log for a virtual disk file in random access memory, the log including ordered log entries;
   identify a log entry in the log, the log entry being the oldest log entry in the log that was generated after a request to commit cached input/output jobs to a storage device was issued;
   add an identifier for the identified log entry to a newly generated log entry; and
   write the newly generated log entry to the log.

2. The computer-readable storage medium of claim 1, further comprising instructions that upon execution cause the processor to:
   write the newly generated log entry to the log, the newly generated log entry including a bit pattern having a size at least as large as a size of a sector of the storage device.

3. The computer-readable storage medium of claim 1, further comprising instructions that upon execution cause the processor to:
   write the newly generated log entry to the log, the newly generated log entry including an indicator, the indicator identifying that a bit pattern for the log entry is all zeros.

4. The computer-readable storage medium of claim 1, further comprising instructions that upon execution cause the processor to:
   write the newly generated log entry to the log, the newly generated log entry including a first sector-sized bit pattern and a second sector-sized bit pattern.

5. The computer-readable storage medium of claim 1, further comprising instructions that upon execution cause the processor to:
   add information that identifies an end of file offset for the virtual disk file to the newly generated log entry.

6. The computer-readable storage medium of claim 1, further comprising instructions that upon execution cause the processor to:
   apply changes to the virtual disk file identified by the log entry and the newly generated log entry in response to receipt of a request to force cached input/output jobs to be committed.

7. The computer-readable storage medium of claim 6, further comprising instructions that upon execution cause the processor to:
   write an additional log entry to the log, the additional log entry includes an identifier for the additional log entry, the additional log entry being the oldest log entry in the log that was generated after a request to commit cached input/output jobs was issued to the storage device.

8. The computer-readable storage medium of claim 6, further comprising instructions that upon execution cause the processor to:
overwrite the log entry in response to a determination that the log entry has been both committed to the storage device and applied to the virtual disk file.

9. The computer-readable storage medium of claim 6, further comprising instructions that upon execution cause the processor to:
scan the log in response to a determination that the virtual disk file was improperly closed;
identify a sequence of valid log entries, the sequence including a newest valid log entry written to the log and each log entry in the sequence written to the log after a discontinuity; and
apply changes to the virtual disk file identified by the sequence of log entries.

10. The computer-readable storage medium of claim 6, further comprising instructions that upon execution cause the processor to:
generate a second log in response to a determination that the virtual disk file was moved to a second storage device, the second storage device having an expanded sector size; and
write an expanded log entry to the second log, the expanded log entry including a bit pattern obtained from the log entry and a bit pattern obtained the virtual disk file.

11. The computer-readable storage medium of claim 6, further comprising:
generate a second log in response to a determination that the virtual disk file was moved to a second storage device, the second storage device having an expanded sector size;
write an expanded log entry to the second log, the expanded log entry including a bit patterns for the second sector obtained from the second log entry and the bit pattern for the first sector obtained from the first log entry.

12. A computer system, comprising:
a processor;
a memory in communication with the processor when the processor is supplied with power, the memory comprising instructions that upon execution cause the processor to:
access a log for a virtual disk file, the log including log entries written in a sequential order;
select a sequence of log entries in response to a determination that each log entry in the sequence is valid, the sequence includes a newest valid log entry, and that each log entry was written to the log after a discontinuity in the log file; and
apply changes to sectors of the virtual disk file identified by the sequence of log entries.

13. The computer system of claim 12, further comprising instructions in the memory that upon execution cause the processor to:
modify an end of file identifier for the virtual disk file based on an end of file identifier stored in a log entry in the sequence of log-entries.

14. The computer system of claim 12, further comprising instructions in the memory that upon execution cause the processor to:
generate a second log in response to a determination that the sector size of a storage device storing the virtual disk file has increased; and
write an expanded log entry to the second log, the expanded log entry including a bit pattern obtained from the virtual disk file and a bit pattern obtained from a log entry in the log.

15. The computer system of claim 12, further comprising instructions in the memory that upon execution cause the processor to:
generate a second log in response to a determination that the sector size of a storage device storing the virtual disk file has decreased; and
write a first contracted and a second contracted log entry to the second log, the first contracted log entry including a portion of a bit pattern obtained from a log entry in the log and a second contracted log entry including a remainder of the bit pattern from the log entry in the log.

16. The computer system of claim 12, further comprising instructions in the memory that upon execution cause the processor to:
write an identifier for an oldest unflushed log entry to each log entry prior to writing each log entry to the log.

17. The computer system of claim 12, further comprising instructions in the memory that upon execution cause the processor to:
overwrite a flushed log entry in response to a determination that a subsequently written log entry includes information indicating that the flushed log entry was committed to a storage device and applied to the virtual disk file.

18. A computer implemented method, comprising:
instantiating a virtual disk for a virtual machine, the virtual disk backed by a virtual disk file;
determining a bit pattern to write to the virtual disk file;
generating a log entry including the bit pattern to write to a log, the log including ordered log entries, the log stored in random access memory;
adding an identifier for an oldest unflushed log entry to the log; and
writing the log entry to the log.

19. The computer implemented method of claim 18, further comprising:
issuing a flush command to a storage device;
applying the bit pattern from the log entry to the virtual disk file in response to receipt of a signal indicating that the storage device completed a flush operation.

20. The computer implemented method of claim 19, further comprising:
scanning the copy of the log stored in the storage device in response to a determination that a power failure occurred;
selecting a sequence of log entries from the copy of the log in response to a determination that each log entry in the sequence is valid, the sequence includes a newest valid log entry, and that each log entry was written to the log after a discontinuity in the log file; and
applying changes to sectors of the virtual disk file identified by the sequence of log entries.

* * * * *